(12) United States Patent
Kay

(10) Patent No.: US 8,665,868 B2
(45) Date of Patent: Mar. 4, 2014

(54) APPARATUS AND METHOD FOR ENHANCING FORWARDING AND CLASSIFICATION OF NETWORK TRAFFIC WITH PRIORITIZED MATCHING AND CATEGORIZATION

(75) Inventor: Rony Kay, Cupertino, CA (US)

(73) Assignee: cPacket Networks, Inc., Mountain View, CA (US)

( * ) Notice: Subject to any disclaimer, the term of this patent is extended or adjusted under 35 U.S.C. 154(b) by 577 days.

(21) Appl. No.: 12/500,493

(22) Filed: Jul. 9, 2009

(65) Prior Publication Data

US 2010/0008359 A1   Jan. 14, 2010

Related U.S. Application Data

(63) Continuation-in-part of application No. 11/483,196, filed on Jul. 7, 2006, now Pat. No. 7,882,554, which is a continuation-in-part of application No. 11/208,022, filed on Aug. 19, 2005, now Pat. No. 7,937,756.

(51) Int. Cl.
*H04L 12/56*     (2011.01)
*G06F 15/16*     (2006.01)

(52) U.S. Cl.
USPC ............................ 370/389; 709/225; 726/13

(58) Field of Classification Search
None
See application file for complete search history.

(56) References Cited

U.S. PATENT DOCUMENTS

| | | | |
|---|---|---|---|
| 5,612,729 A | 3/1997 | Ellis et al. | |
| 5,765,026 A | 6/1998 | Lin et al. | |
| 6,076,115 A | 6/2000 | Sambamurthy et al. | |
| 6,529,508 B1 * | 3/2003 | Li et al. | 370/392 |
| 6,598,034 B1 | 7/2003 | Kloth | |
| 6,639,896 B1 | 10/2003 | Goode et al. | |
| 6,651,101 B1 | 11/2003 | Gai et al. | |
| 6,691,168 B1 * | 2/2004 | Bal et al. | 709/238 |
| 6,807,611 B2 | 10/2004 | Hauck et al. | |
| 6,870,929 B1 | 3/2005 | Greene | |
| 7,032,003 B1 | 4/2006 | Shi et al. | |
| 7,227,842 B1 * | 6/2007 | Ji et al. | 370/235 |
| 7,519,070 B2 * | 4/2009 | Van Lunteren | 370/397 |
| 7,539,750 B1 | 5/2009 | Parker et al. | |
| 7,720,826 B2 * | 5/2010 | Fitzer et al. | 707/694 |
| 7,840,696 B2 * | 11/2010 | Horgan | 709/236 |

(Continued)

FOREIGN PATENT DOCUMENTS

EP     1202500     5/2002

OTHER PUBLICATIONS

PCT/US2007/072536 International Search Report (Jul. 7, 2006) C-Packet Networks.

(Continued)

*Primary Examiner* — Timothy J Weidner
(74) *Attorney, Agent, or Firm* — Cooley LLP

(57) ABSTRACT

An apparatus is described that performs prioritized matching through processing of network traffic in accordance with provisioned rules and policies. The apparatus includes a plurality of microcode controlled state machines, and a distribution circuit that routes input data to the plurality of microcode controlled state machines, such that the plurality of microcode controlled state machines apply rules to the input data to determine matches and produce priority indicators, wherein each match has an associated priority indicator. At least one of the matches is selected based on the priority indicators. Advantageously, the apparatus provides an architectural framework well suited to a low cost, high speed, robust implementation of flexible, advanced network security and monitoring features and network traffic analysis.

16 Claims, 14 Drawing Sheets

(56) References Cited

U.S. PATENT DOCUMENTS

| | | | |
|---|---|---|---|
| 7,894,480 B1* | 2/2011 | Wang et al. | 370/474 |
| 7,953,082 B2* | 5/2011 | Cho et al. | 370/389 |
| 8,024,799 B2 | 9/2011 | Kay | |
| 2002/0009076 A1* | 1/2002 | Engbersen et al. | 370/389 |
| 2002/0012340 A1 | 1/2002 | Kalkunte et al. | |
| 2003/0156586 A1* | 8/2003 | Lee et al. | 370/392 |
| 2004/0054925 A1 | 3/2004 | Etheridge et al. | |
| 2004/0093521 A1 | 5/2004 | Hamadeh et al. | |
| 2004/0165588 A1 | 8/2004 | Pandya | |
| 2004/0264373 A1* | 12/2004 | Engbersen et al. | 370/230 |
| 2005/0078601 A1 | 4/2005 | Moll et al. | |
| 2005/0102393 A1 | 5/2005 | Murray et al. | |
| 2005/0238022 A1 | 10/2005 | Panigrahy | |
| 2006/0026669 A1 | 2/2006 | Zakas | |
| 2006/0221956 A1* | 10/2006 | Narayan et al. | 370/389 |
| 2007/0006293 A1* | 1/2007 | Balakrishnan et al. | 726/13 |
| 2007/0056028 A1* | 3/2007 | Kay | 726/11 |
| 2007/0056029 A1* | 3/2007 | Kay | 726/11 |
| 2007/0056030 A1* | 3/2007 | Kay | 726/11 |
| 2007/0058540 A1* | 3/2007 | Kay | 370/230 |
| 2007/0064717 A1 | 3/2007 | Wu et al. | |
| 2007/0083929 A1* | 4/2007 | Sprosts et al. | 726/22 |
| 2009/0138577 A1* | 5/2009 | Casado et al. | 709/220 |
| 2009/0288136 A1* | 11/2009 | Chang et al. | 726/1 |
| 2009/0307175 A1* | 12/2009 | Francesco et al. | 706/48 |
| 2010/0011101 A1 | 1/2010 | Kay | |
| 2010/0011434 A1 | 1/2010 | Kay | |

OTHER PUBLICATIONS

PCT/US2006/032257 ISR & Written Opinion (Sep. 20, 2007) C-Packet Networks.
PCT/US2007/072524 International Search Report (Apr. 8, 2008) C-Packet Networks.
PCT/US2007/072530 International Search Report (Mar. 4, 2008) C-Packet Networks.
Kay, U.S. Appl. No. 11/208,022, filed Aug. 19, 2005. Office Action mailed Dec. 1, 2009.
Kay, U.S. Appl. No. 11/208,022, filed Aug. 19, 2005. Office Action mailed Jun. 9, 2009.
Kay, U.S. Appl. No. 11/208,022, filed Aug. 19, 2005. Office Action mailed Nov. 4, 2008.
Kay, U.S. Appl. No. 11/483,265, filed Jul. 7, 2006. Office Action mailed Aug. 9, 2010.
Kay, U.S. Appl. No. 11/483,265, filed Jul. 7, 2006. Office Action mailed Aug. 13, 2009.
Kay, U.S. Appl. No. 11/483,265, filed Jul. 7, 2006. Office Action mailed Jan. 21, 2009.
Kay, U.S. Appl. No. 11/483,265, filed Jul. 7, 2006. Office Action mailed Feb. 3, 2010.
Kay, U.S. Appl. No. 11/483,196, filed Jul. 7, 2006. Office Action mailed Mar. 2, 2010.
Kay, U.S. Appl. No. 11/483,251, filed Jul. 7, 2006. Office Action mailed Jul. 8, 2010.
Kay, U.S. Appl. No. 11/483,251, filed Jul. 7, 2006. Office Action mailed Dec. 16, 2009.
PCT/US07/72536 ISR-WO, Jul. 7, 2008, CPacket Networks, Inc.
PCT/US06/32257 ISR-WO, Sep. 20, 2007, CPacket Networks, Inc.
PCT/US2010/041593. International Search Report (Feb. 21, 2011). C-Packet Networks.
Kay, U.S. Appl. No. 11/208,022, filed Aug. 19, 2005. Office Action mailed Aug. 10, 2010.
Kay, U.S. Appl. No. 11/208,022, filed Aug. 19, 2005. Notice of Allowance mailed Feb. 28, 2011.
Kay, U.S. Appl. No. 11/483,196. Notices of Allowance mailed Aug. 19, 2010 and Dec. 14, 2010.
Kay, U.S. Appl. No. 11/483,251, filed Jul. 7, 2006. Notices of Allowance mailed Sep. 20, 2010 and Dec. 30, 2010.
Office Action issued to U.S. Appl. No. 11/208,022, Aug. 10, 2010, 13 pgs.
Notice of Allowance issued to U.S. Appl. No. 11/208,022, Feb. 28, 2011, 7 pgs.
Notice of Allowance issued to U.S. Appl. No. 11/483,265, May 19, 2011, 7 pgs.
Office Action issued to U.S. Appl. No. 12/500,527, May 9, 2012, 6 pgs.
Notice of Allowance issued to U.S. Appl. No. 12/500,527, Aug. 30, 2012, 5 pgs.
International Search Report and Written Opinion issued to International Patent Application No. PCT/US10/41593, Feb. 21, 2011, 9 pgs.
Notice of Allowance issued to U.S. Appl. No. 11/483,196, Aug. 19, 2010, 6 pgs.
Notice of Allowance issued to U.S. Appl. No. 11/483,196, Dec. 14, 2010, 7 pgs.
Notice of Allowance issued to U.S. Appl. No. 11/483,251, Sep. 20, 2010, 7 pgs.
Notice of Allowance issued to U.S. Appl. No. 12/500,519, Jun. 25, 2012, 7 pgs.
Truong, Thanhnga B, "Notice of Allowance", U.S. Appl. No. 11/483,251, Dec. 30, 2010, 9 pgs.
Woldemariam, Nega, "Non-Final Office Action", U.S. Appl. No. 12/500,519, Dec. 13, 2011, 12 pgs.

* cited by examiner

Example of CWR Rule Engine Execution Sequence

| Addr State ID | Opcodes Operation and configuration | Operands Values to compare against | Next Addresses | Control |
|---|---|---|---|---|
| 0 | Initialization & clean-up of internal states (E.g. set global control for ECP override such that next (i.e. next address) is 5 if SEGMENT is a separator between packets)* | | | |
| 1 | Compare SEGMENT for equality | To Value: 'ab' | If equal: next = 2<br>otherwise: next = 1 | advance SEGMENT |
| 2 | Compare SEGMENT for equality | To Value: 'cd' | If equal: next = 3<br>otherwise: next = 1 | advance SEGMENT<br>same SEGMENT |
| 3 | Range check for the SEGMENT and Compare SEGMENT for equality | Range Lower Bound: 10<br>Range Upper Bound: 14<br>Equality operand: 'ab' | case in range: next = 4<br>case not in range & equal: next = 2<br>otherwise: next = 1 | advance SEGMENT<br>advance SEGMENT<br>same SEGMENT |
| 4 | End State Match | | Next = 0 | Done, match |
| 5 | End State NO Match | | Next = 0 | Done, NO match |

* when the SEGMENT is equal to a separator between packets ('–') it causes the next address to End State NO Match

*FIG. 6*

APPARATUS AND METHOD FOR ENHANCING FORWARDING AND CLASSIFICATION OF NETWORK TRAFFIC WITH PRIORITIZED MATCHING AND CATEGORIZATION

CROSS-REFERENCE TO RELATED APPLICATIONS

This application is a continuation-in-part of the patent application of R. Kay, entitled "Apparatus and Method for Selective Mirroring," U.S. Ser. No. 11/483,196, filed on Jul. 7, 2006, now U.S. Pat. No. 7,882,554 which is a continuation-in-part of the patent application of R. Kay, entitled "Apparatus and Method for Facilitating Network Security," U.S. Ser. No. 11/208,022, filed on Aug. 19, 2005, now U.S. Pat. No. 7,937,756 the contents of which are incorporated by reference in its entirety.

This application is also related to copending application U.S. Ser. No. 12/500,519, "Apparatus and Method for Associating Categorization Information With Network Traffic to Facilitate Application Level Processing," and U.S. Ser. No. 12/500,527, "Apparatus and Method for Biased and Weighted Sampling of Network Traffic to Facilitate Network Monitoring," both filed on the same day as the present application, the contents of which are hereby incorporated by reference.

FIELD OF THE INVENTION

The present invention relates generally to processing of computer network traffic to facilitate network security and network monitoring applications. More particularly, this invention relates to facilitating optimized, cost-effective and flexible network security and network traffic monitoring features.

BACKGROUND OF THE INVENTION

The pervasive use of computer networks to increase productivity and to facilitate communication makes network security and network traffic monitoring critical concerns. Attacks targeting both individual hosts or local area networks (LANs) and the wide-area network (WAN) infrastructure are becoming increasingly sophisticated and frequent. Typically, a perimeter firewall is used to exclude unauthorized traffic from a customer LAN. Anti-virus (AV) software is used to eliminate viruses that may have entered the LAN and infected individual hosts. These existing preventive strategies, though simple and useful, have not prevented continuing damage in the billions of dollars from attacks on major organizations.

Both a firewall and AV software have limited monitoring, detection, and reaction capabilities for facilitating network security. A firewall filters out traffic from known unauthorized sources based on packet header. A firewall is typically not designed to diagnose or to react to a potential attack based on changes in network behavior or performance, or based on signatures hidden deep within packet contents. Also, a firewall typically does not provide flexibility in how to react beyond filtering of all traffic with specific header fields, such as source and destination addresses and ports. A firewall is usually deployed only at the LAN perimeter and therefore does not prevent propagation of attacks inside a LAN.

AV software runs primarily on hosts. Such software recognizes the digital signatures of known viruses but typically cannot detect new viruses, and is also not suited to monitoring of high-speed network traffic. Inherently, AV software has limited visibility of network traffic because AV software resides on a particular host.

It would be highly desirable to provide an apparatus with monitoring capabilities sufficiently comprehensive to enable detection of new types of attacks, and with reactive options proportionate to the threat posed by the attack.

The architecture of an apparatus with this advanced feature set desirably should overcome various hurdles. Current advanced security systems such as intrusion detection systems (IDS) typically rely on off the shelf computer system components, including central processing units (CPUs), memory, operating systems, and peripherals. Additional co-processors, such as network processors (NPs) and content addressable memories (CAMs), provide enhanced monitoring and detection capabilities at higher speeds, but at substantial additional cost. Hardware architectures that are not customized to this application often have non-deterministic performance that depends on the dynamic variation of input traffic patterns, making hardware resource use inefficient and validation difficult. The inability to guarantee performance is often a barrier to deployments in high speed networks where traffic has real time characteristics (e.g. interactive voice and media applications). Additional complexity, such as memory hierarchy, caches, or complex queuing structures, is required to support high bandwidth and/or low latency networks and to avoid unacceptable network performance degradation in corner case traffic scenarios. Inflexibility may result from limitations inherent to the components used, such as unoptimized instruction sets or unavailability of desired building block features. It would be desirable, given the importance of customer LAN performance, to provide a low cost, high speed, robust, and flexible apparatus with the advanced features needed for facilitation of network security traffic monitoring. Such an apparatus would enable a paradigm shift in network security and network traffic monitoring toward more rapid reaction to and tighter containment of attacks on networks that are not initially prevented.

SUMMARY OF THE INVENTION

One embodiment of the invention relates to an apparatus that performs prioritized matching through processing of network traffic in accordance with provisioned rules and policies. One embodiment of the apparatus includes a plurality of microcode controlled state machines, and a distribution circuit that routes input data to the plurality of microcode controlled state machines, such that the plurality of microcode controlled state machines apply rules to the input data to determine matches and produce priority indicators, where each match has an associated priority indicator. At least one of the matches is selected based on the priority indicators. This embodiment provides an architectural framework well suited to a low cost, high speed, robust implementation of flexible, advanced network security and monitoring features and network traffic analysis.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of the invention, reference should be made to the following detailed description taken in conjunction with the accompanying drawings, in which:

FIG. 6 illustrates an example of an execution sequence of microcode instructions to implement a comparison rule;

DETAILED DESCRIPTION OF THE INVENTION

Figure 1:
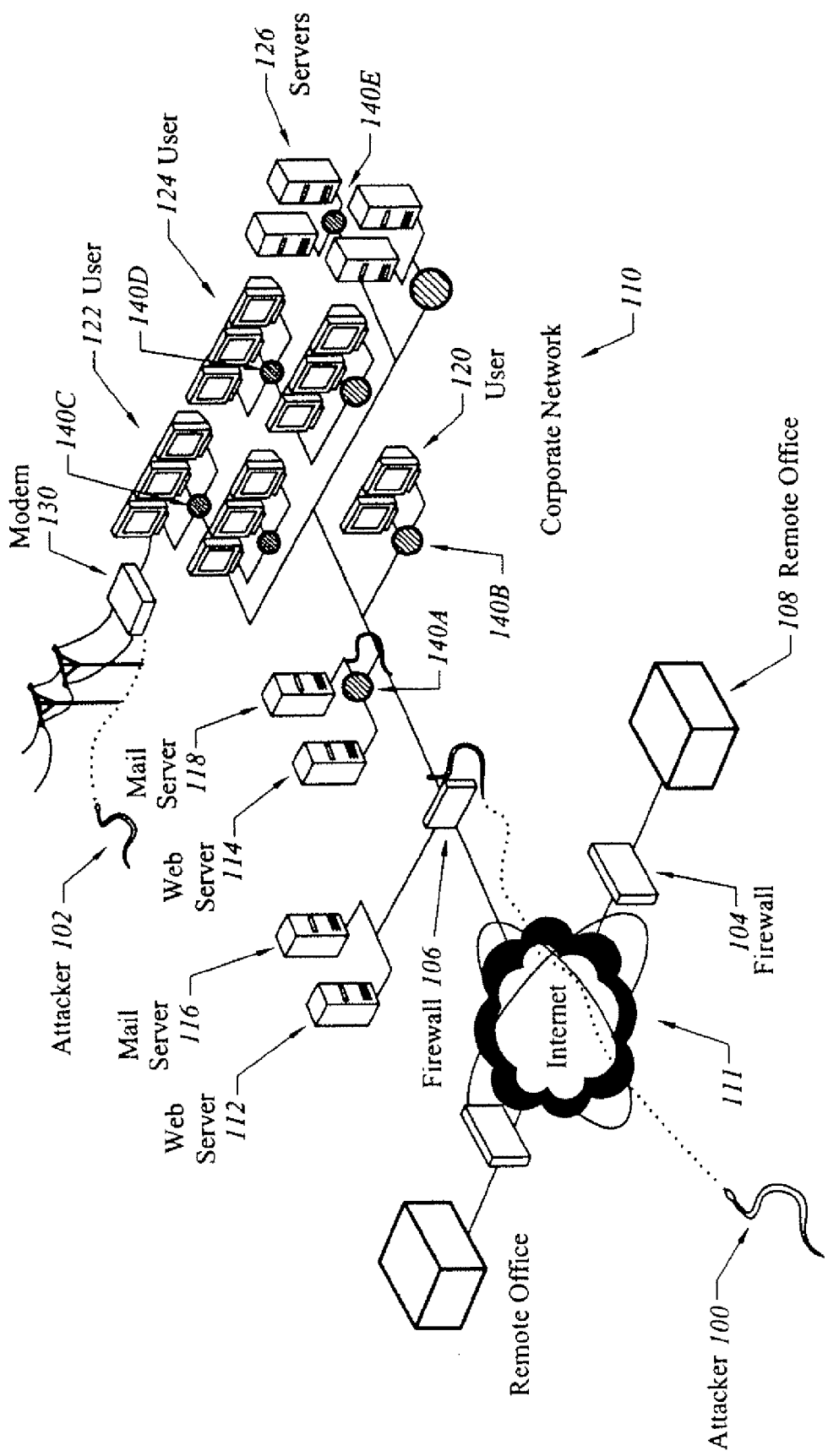
FIG. 1 illustrates a network with representative locations at which embodiments of the invention can be deployed.

FIG. 1 illustrates a network with representative locations at which embodiments of the invention can be deployed. A main corporate network 110 is separated from the Internet 111 by a firewall 106. A remote office 108 is separated from the Internet by a firewall 104. The network 110 and the remote office 108 can be connected by various technologies known in the art, such as virtual private network (VPN) client software. The partitioning of network 110 allows external users to access a web server 112 and a mail server 116 without traversal of the firewall 106, and prevents unauthorized external users from accessing the remainder of the network 110. The portion of the network 110 protected by the firewall 106 includes client machines (users) 120, 122, and 124, general servers 126, web server 114, and mail server 118.

The firewalls 104 and 106 aim to prevent attacks by unauthorized users. However, various types of attacks, represented by an attacker 100, can penetrate the firewall 106. Once the firewall 106 is breached, the infection spreads freely throughout the network 110. In addition, access to the network 110 by an attacker 102 is further facilitated by any unprotected path into the network 110 that does not traverse the firewall 106, such as via a modem 130, which is traversed by attacker 102.

An apparatus positioned within the firewall perimeter of the network 110 is needed to prevent infections of one portion of the network 110 from spreading to other portions of the network 110. FIG. 1 shows representative locations for the apparatus 140 at 140A, 140B, 140C, 140D, and 140E. The apparatus 140A separates the web server 114 and the mail server 118 from the rest of the network 110. The apparatuses 140B, 140C, and 140D separate the users 120, 122, and 124, respectively, from the rest of the network 110. The apparatus 140E separates the servers 126 from the rest of the network 110. If it is necessary to allow access to the network 110 via the modem 130, the apparatus 140C is used to prevent the attacker 102 from accessing portions of the network 110 beyond the user 122.

To help prevent or limit an attack, it is contemplated that embodiments of the invention enable network monitoring that may be sufficiently comprehensive to expose new types of attacks not recognized by firewalls or AV software. Effective monitoring requires extensive collection of network statistics to enable network behavioral analysis. Collection of statistics may be supplemented by snapshot copying of all collected statistics at an instant, or aggregation and correlation of information from multiple apparatuses to provide a clear view of network status and behavior. Embodiments of the invention may facilitate network security solely through monitoring.

In addition, attacks can be prevented proactively by provisioning the apparatus with rules to prevent malicious code from reaching a vulnerable portion of the network. A rule is a specific criterion used by the apparatus to determine whether it must react to a potential breach of network security. One type of rule is signature-based. Signatures are sequences of bits anywhere within the digital content of traffic that indicate the presence of a virus or other malicious traffic. The sequences of bits may be entirely invariant, or may contain portions that are wildcards inessential to rule evaluation. A signature could appear in the header or payload of individual network packets, or across a sequence of packets. A signature may span one or more packet headers and corresponding payloads, and therefore deep packet inspection is required. Stream inspection is required to discover signatures across a sequence of packets. Both types of inspection are required for total visibility of various types of network traffic.

A second type of rule is behavioral. Two types of behavioral rules are local and network-based behavioral rules. It is contemplated that local behavioral rules can be used to detect changes that can be measured locally at an apparatus 140. These changes include but are not limited to changes in the volume of traffic or in the balance of inbound and outbound traffic, such as requests and responses, passing through the apparatus 140. Network-based behavioral rules can be used to detect changes in the network that can be measured in conjunction with other network devices, including but not limited to apparatus 140. An example of such a rule is the total traffic volume averaged across multiple points in the network during a specific time period compared to a maximum threshold. Another example is the total number of events of a specific type, such as network error indications, that have occurred across the network during a specific time period, again compared to a maximum threshold. Monitoring of collected statistics required for rule evaluation is important because a new type of attack can be detected based on its impact on network performance or behavior, even when its signature is unknown.

A third type of rule is both signature-based and behavioral. An example of such a rule is the total number of packets containing a specific signature that have passed through an apparatus 140 during a specific time period during the day compared to a maximum and/or minimum threshold.

After an attack is detected, embodiments of the invention enable a variety of reactions beyond simply filtering or dropping packets with a known signature, as would be done by a firewall. For example, duplication of traffic or re-direction of traffic to a different physical path than other traffic allows for in-depth examination or quarantine of suspicious traffic without immediate dropping of such traffic. Further, limiting the rate of specific traffic types or events per time unit can protect against attacks such as denial of service by limiting the number of packets or requests that reach the portion of the network under attack. The best possible network performance under normal circumstances can be supported with multilevel policies. These policies combine rules and their dependencies, with more restrictive policies applied when looser policies indicate that an attack may be in progress. Policy enforcement is bidirectional and therefore it can prevent an infection from entering or escaping a portion of a LAN.

Figure 2:
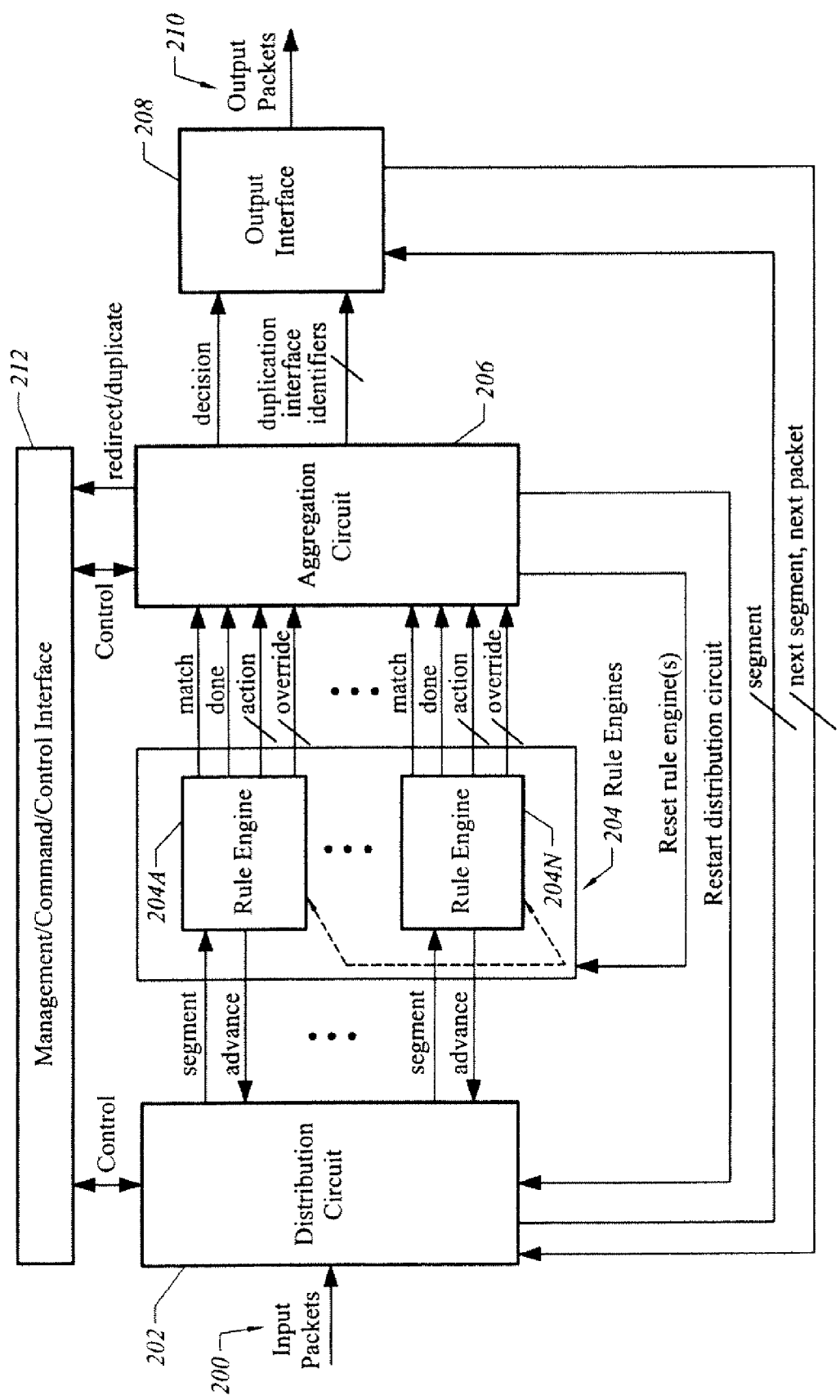
FIG. 2 illustrates a logical block diagram of the architecture of embodiments of the invention.

FIG. 2 illustrates a logical block diagram of the architecture of an embodiment of the invention. The apparatus can be deployed as a "bump in the wire" with three (or more) interfaces. In one embodiment, there is one interface for input network traffic 200, a second interface for output network traffic 210, and a third interface 212 for output network traffic that has been duplicated or re-directed, or for management communications. Input packets 200 from the network 110 first enter a distribution circuit 202. In the illustrated embodiment, the distribution circuit 202 divides the input packets 200 into traffic segments. In another embodiment, the input packets 200 are divided into segments by a pre-processor that may precede the distribution circuit. This pre-processor, which may be a custom or standard protocol core, can also provide packet fragmentation/re-assembly and/or packet re-ordering functionality. A traffic segment is typically a fixed-length sequence of bytes derived from a single input packet, in the same order as the bytes that entered the distribution circuit 202. A traffic segment is not to be confused with a Transmission Control Protocol (TCP) segment, which could include multiple packets. If a packet does not have enough bytes remaining to fill a traffic segment, the remaining bytes of the traffic segment are unused. Each byte of a traffic segment may be associated with a control bit that serves as a validity indicator, with unused bytes marked as invalid.

In the embodiment illustrated in FIG. 2, each traffic segment is routed in parallel for processing by each rule engine of a set of rule engines 204A-204N, hereinafter referred to as 204. The distribution circuit 202 also holds each of the input packets 200 until an output interface 208 indicates to the distribution circuit 202 whether the packet should be forwarded or deleted, for example by skipping. These segments are of a width in bytes equal to the bus width for segments between the distribution circuit 202 and each rule engine 204, and between the distribution circuit 202 and the output interface 208.

Each rule engine 204 asserts an advance indication to the distribution circuit 202 when it is ready for additional traffic segments from the distribution circuit 202. When all rule engines 204 have asserted their advance lines, the distribution circuit 202 sends the next traffic segment to all rule engines 204. Each of the individual rule engines 204 executes a configured rule. In one embodiment, each rule engine 204 evaluates to a value of true or false and asserts a done line at the end of each packet.

After a rule engine 204 has completed evaluation of a rule, it notifies the aggregation circuit 206 of the result. If the rule evaluates to true, the match line to the aggregation circuit 206 is asserted. When evaluation of a rule is completed for a data portion, which can be the set of traffic segments obtained from the division of one or more input packets 200, the done line is asserted. The action lines indicate to the aggregation circuit 206 whether to redirect or to duplicate the data segment, and allow future scalability to additional interfaces for duplication or redirect. When the output of a rule engine 204A is to override the outputs of a subset of rule engines 204B-204N, the rule engine 204A may assert override lines corresponding to that subset of rule engines 204B-204N. In another embodiment, the rule engine 204A may assert one override line that overrides rule engines 204B 204N.

The aggregation circuit 206 includes output logic that enforces policies, which are sets of rules and the logical, causal, and/or temporal relationship between them. The aggregation circuit 206 waits until all rule engines 204 assert their corresponding done bits before making a decision based on the outputs of all rule engines 204. The decision, typically to drop, forward or duplicate the packet, is passed to the output interface 208, along with a duplication interface identifier. The duplication interface identifier indicates to the output interface 208 if the packet is being duplicated. The aggregation circuit 206 asserts a restart to the distribution circuit 202 when the aggregation circuit 206 determines that the distribution circuit 202 can skip all remaining segments of the current packet and go directly to processing of the next packet. It can be desirable for the aggregation circuit 206 to also support duplication or re-direction of traffic to the management interface 212.

When a packet is to be forwarded, the output interface 208 requests via the next packet line that the next packet be sent to it from the distribution circuit 202. During the transfer of the next packet, the output interface 208 asserts a next segment indication to the distribution circuit 202 when it is ready for one or more additional traffic segments from the distribution circuit 202. In one embodiment, when the output interface 208 receives traffic segments from the distribution circuit 202, the output interface 208 may buffer some or all of the packet, as necessary, before transmitting it as an output packet 210. This depends on the post-processing functions that it may need to perform, which may include, but are not restricted to, encryption. In another embodiment, segments of the packet may be sent out as they are received by output interface 208. In that mode of operation, if the decision of the aggregation circuit 206 is to drop the packet, then the packet is truncated and becomes practically unusable by connected equipment receiving the packet.

For packet and stream processing, there need not be involvement of any general purpose central processing unit (CPU). There is a general management/command/control interface available for external equipment, typically containing a CPU, to control the distribution circuit 202, the aggregation circuit 206, and all rule engines 204 via control of the aggregation circuit 206.

An embodiment of a rule engine 204 is a microcode controlled state machine that executes a configured behavioral or signature-based rule. A rule is compiled to a set of bits, or microcode, that is used to program the microcode controlled state machine and associated configuration registers. Each microcode controlled state machine includes a computation kernel operating in accordance with microcode stored in an associated control store. The microcode controlled state machines configure an optimized data path to perform such operations as equality, masked equality, and range inclusion/exclusion operations on each traffic segment. The data path comprises shallow stages whose implementation requires only a few logic levels, thus enabling a very high frequency design.

The set of rule engines 204 can be implemented as a pipelined fabric of microcode controlled state machines that operate concurrently and collaboratively on each traffic segment. This regular structure lends itself to creation of high capacity, parallel designs through replication of a small number of fundamental building blocks. It also provides an ability to preserve state information, such as TCP connection information, locally in the relevant microcode controlled state machine as part of its state in contrast to the typical approach in firewalls of preserving state information of all connections in shared memory, this fabric also allows for state information to be stored as a local state of a single microcode controlled state machine. However, the architecture also supports a global state table (that may contain connection information) that is globally available to all rule engines 204. The global state table may be maintained in a CAM or an external memory, and may be implemented as on-chip memory. If in a CAM or an external memory, the global state table may be accessed by the rule engines 204 via the management interface 212, which is responsible for a controller that maintains the state information and presents relevant state information pertaining to the current packet to all the rule engines. The information in the global state table may be simultaneously accessed by the rule engines 204, such as via hardware signal lines to each rule engine 204. In this embodiment, no clock cycles are wasted managing queues of requests for lookups to a CAM or an external memory. The global state table may be updated on a per packet basis by dedicated hardware. This architecture, along with its associated instruction set, can also be customized and optimized. This allows for efficient, easily configurable, and unified header processing and deep inspection of packet payloads.

The aggregation circuit 206 includes output logic that enforces policies. A policy may be a simple collection of rules related using Boolean logic. In one embodiment, the aggregation circuit 206 aggregates the outputs of individual blocks, for example expressed as a Boolean OR of several rules. If any of these multiple rules are true, then a configured action is taken, such as dropping the packet. The aggregation policy can be implemented as a tree, where each tree node can be configured to function as a logical OR or AND. A policy can be configured to be a complicated composite relationship between rules, such as a sum of products, and/or a causal or temporal relationship. The aggregation logic can implement any combinatorial or sequential logic.

In one embodiment, the aggregation circuit 206 generates control signals to activate and deactivate a subset of one or more of the set of rule engines 204. The aggregation logic can also reset or provide rule feedback to the subset of rule engines 204, and can set parameters used by the distribution circuit 202. A rule engine 204 can include logic and can generate control signals to directly activate and deactivate one or more other rule engines.

FIG. 2 illustrates an example of a parametric architecture, which enables scaling of key performance metrics, such as throughput, with design parameters, such as traffic segment width, without changing the fundamental structure of the architecture. Wider traffic segments, which correspond to a wider data path, can be used to increase overall system throughput by pushing more bits per hardware clock cycle through the apparatus. It is possible to tune the data path width and to make a trade-off between the use of silicon resources (gates) and the operating frequency of the apparatus. The worst-case throughput through the apparatus can be accurately calculated by multiplying the traffic segment width by the number of clock cycles per second divided by the worst-case number of clock cycles per traffic segment. For typical applications, the worst-case number of clock cycles per traffic segment is less than five, preferably two. The worst-case latency can be accurately calculated depending on whether the forwarding policy is store and forward, or cut-through. For store and forward, the worst case latency is directly proportional to the quotient of the number of segments in two maximum size packets divided by the clock frequency. The processing time is linear in the number of traffic segments in a packet.

The architecture illustrated in FIG. 2 is designed to be optimal, specifically, for network security and monitoring applications. However, this architecture is also general enough to implement general purpose pattern matching, including packet classification, deep inspection, and on-the-fly database applications. The common denominator is the concept of processing data one segment at a time, where the size of a segment is a design parameter of a parametric architecture.

Rules used by rule engines 204 can be specified in several ways, including but not limited to bit configuration of the hardware, use of low level assembler, translation from existing languages used by common intrusion detection systems (IDS) and firewalls, or use of a high level language. In one embodiment, low level assembler is used, based on a unique and proprietary instruction set architecture (ISA) corresponding to an underlying hardware architecture optimized for network security applications. In another embodiment, a high level, tailored rule definition language is used, based on a proprietary high level language for the Stream and Packet Inspection Front End (SPIFE). Some examples of rules in a high level rule definition language include:

drop inbound eth:ip:tcp ip.src=1.2.3.4, tcp.dport=80;
Meaning: drop TCP packets that are coming inbound (from the external network toward the protected segment), which have an IP source address of 1.2.3.4 and a destination port 80 (http).

drop inbound eth:ip:udp payload: "malicious";
Meaning: drop User Datagram Protocol (UDP) packets that are coming inbound (from the external network toward the protected segment) if their payload contains the keyword "malicious".

drop inbound eth:ip:udp payload: "malic*ious" [ignorecase];
Meaning: drop User Datagram Protocol (UDP) packets that are coming inbound (from the external network toward the protected segment) if their payload includes the keyword "malicious" where any number of characters separates the "c" from the "i". The payload is case-insensitive, such that, for example, "Malicious", "mAliCicious", and "MALICIOUS" are dropped.

count all inbound eth:ip:icmp icmp.type=PING_REPLY;
Meaning: count Internet Control Message Protocol (ICMP) ping-reply packets sent via the IP and Ethernet protocol layers.

duplicate all inbound eth:ip icmp icmp.type=PING_REPLY;
Meaning: duplicate inbound ICMP ping-reply packets sent via the IP and Ethernet protocol layers to the third interface without interfering with the normal packet flow from the first interface to the second interface, or from the second interface to the first interface.

redirect all inbound eth:ip:icmp icmp.type=PING_REPLY;
Meaning: redirect inbound ICMP ping-reply packets sent via the IP and Ethernet protocol layers to the third interface.

Figure 3:
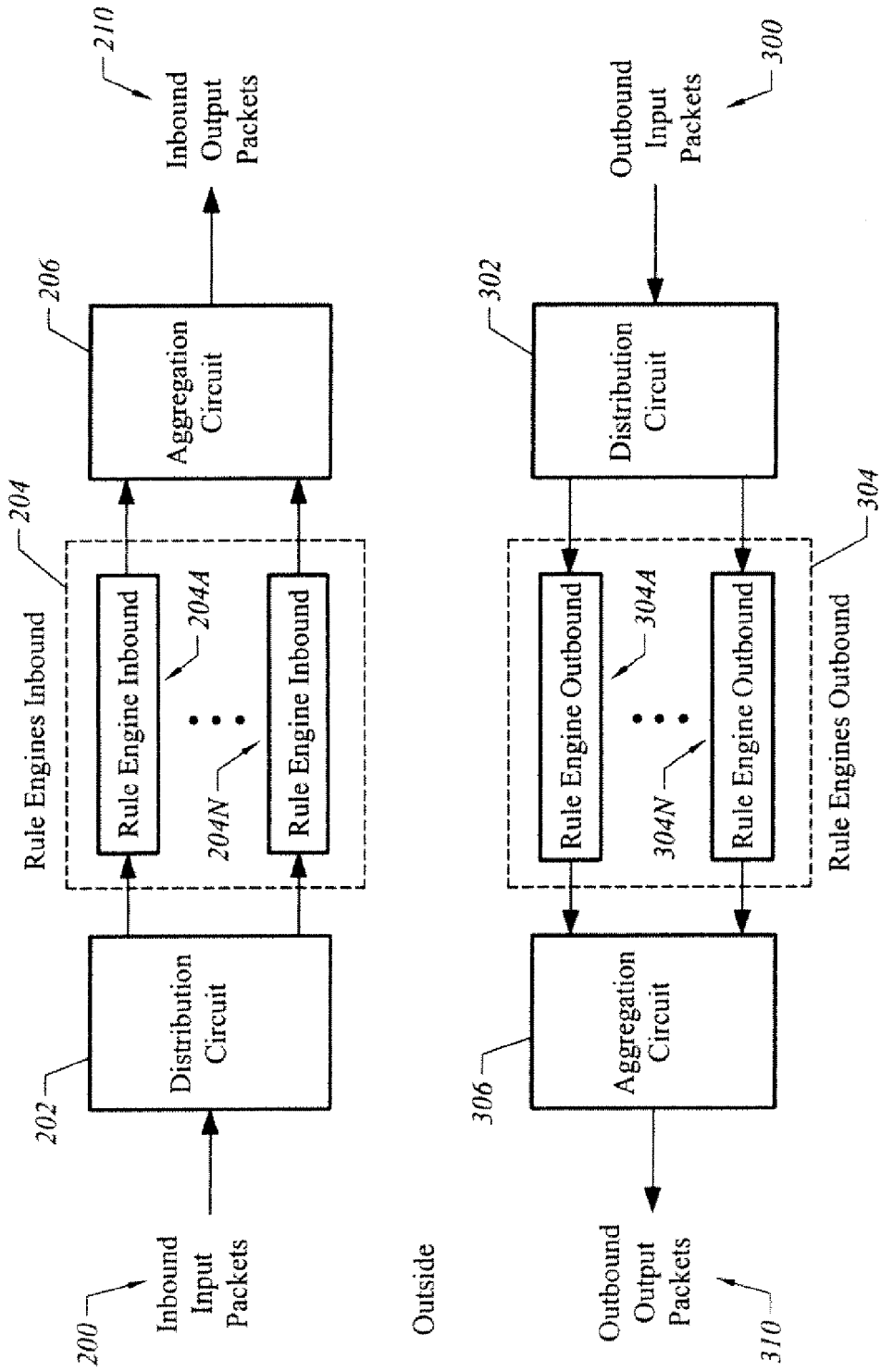
FIG. 3 illustrates the use of the architecture of FIG. 2 for bidirectional applications.

FIG. 3 illustrates the use of the architecture of FIG. 2 for bidirectional applications. One example is client-server applications, for which it is desirable to monitor bidirectional protocol behaviors or event triggering. If the server is outside the portion of the network protected by the apparatus and the client is inside that portion of the network, traffic from the server is inbound, and requests and responses from the client are outbound. Inbound input packets 200 are processed by the distribution circuit 202, the set of rule engines 204, and the aggregation circuit 206. The output interface 208 is not shown in FIG. 3 for simplicity. The distribution circuit 202, the set of rule engines 204, and the aggregation circuit 206 form a first path in the inbound, or first, direction, and can be aligned with a distinct distribution circuit 302, set of rule engines 304, and aggregation circuit 306 that form a second path in an outbound, or second, direction different from, such as opposite to, the first direction. Alignment in this context is conceptual, and does not imply any restrictions on the physical positioning of these blocks relative to each other in an implementation. To handle bidirectional applications, it can be desirable for the set of rule engines 204 to exchange control information with the set of rule engines 304. In another embodiment, each rule engine 204 could dynamically alternate between processing traffic from the first path and the second path. This dynamic alteration may be controlled by microcode, and may also be controlled by the configuration bits of the rule engine 204. The rule engines 204 may alternate between processing traffic from the first path and the second path independently and/or as a group.

Figure 4:
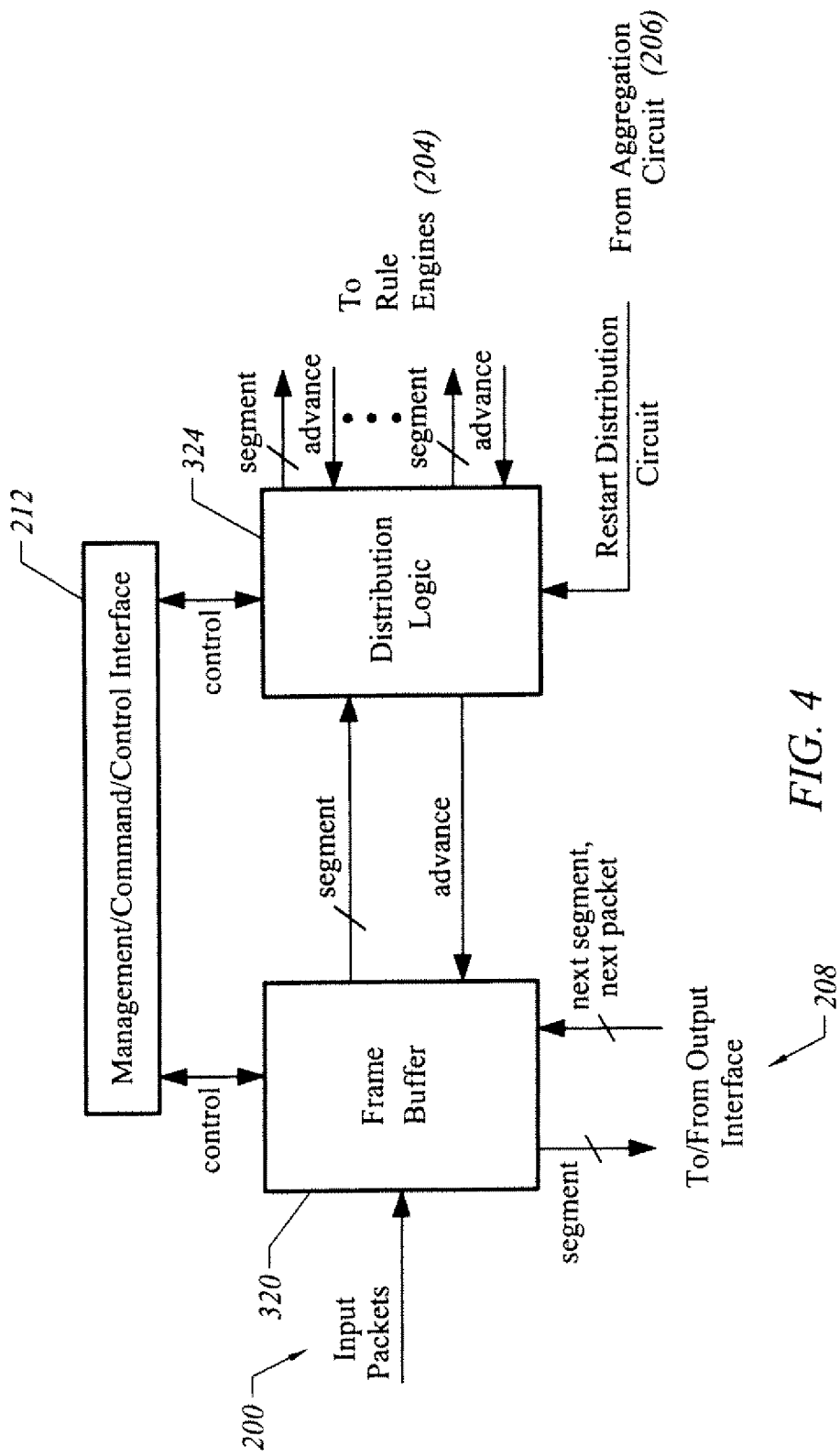
FIG. 4 illustrates the internal architecture of the distribution circuit shown in FIG. 2.

FIG. 4 illustrates one embodiment of the internal architecture of the distribution circuit 202 shown in FIG. 2. The input packets 200 enter a frame buffer 320. In this embodiment, the buffer 320 is a FIFO buffer, and is logically organized in segment sizes equal to the width of the data path through the apparatus. The input packets 200 may have already been partitioned into traffic segments by a pre-processor, in which case the frame buffer 320 may not be required. Otherwise, the input packets 200 are placed into the frame buffer 320 with a separator between the input packets 200. The frame buffer 320 logically has one write port, for the input packets, and two read ports, one for a distribution logic block 324 and the other for the output interface 208. A standard implementation of such a buffer uses two separate memory blocks, such that one is near the input interface and one is near the output interface. In a store-and-forward implementation, a packet remains stored in the frame buffer 320 until a decision by the rule engines 204 has been communicated by the aggregation circuit 206 to the output interface 208, causing the output interface 208 to assert the next packet line. In a cut-through implementation, each traffic segment of a packet is forwarded without delay to the output interface 208. A kill signal may be sent to the output interface 208 to cause the output interface 208 to corrupt a portion of the packet in order to cause the packet to be discarded by the devices on the receiving end in the network. Both the frame buffer 320 and the distribution logic 324 can have management/command/control interfaces.

The distribution logic 324 grabs a data segment out of the frame buffer 320 when all of the connected rule engines 204 are ready for the next segment of data, as indicated by their de-assertion of their advance control lines to the distribution logic 324. If one or more of the rule engines 204 is not ready, the distribution logic 324 de-asserts the advance control line to the frame buffer 320 and waits until all of the rule engines 204 are ready. The distribution logic 324 receives the restart from the aggregation circuit 206, described in FIG. 2, that causes the distribution logic 324 to skip all remaining segments of the current packet and go directly to processing of the next packet.

Figure 5:
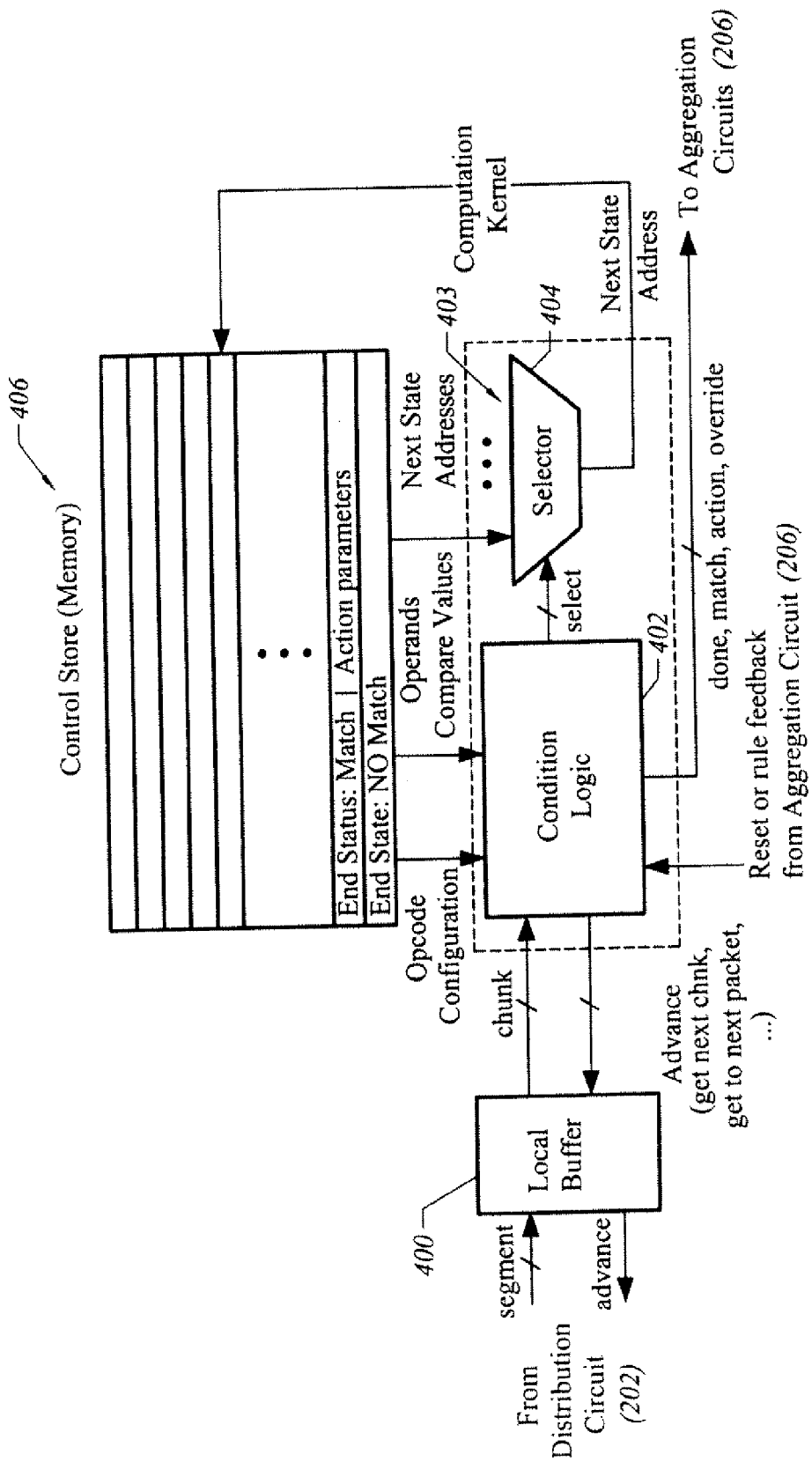
FIG. 5 illustrates the internal architecture of the rule engine shown in FIG. 2, based on a microcode controlled state machine.

FIG. 5 illustrates the internal design of a rule engine 204 based on a microcode controlled state machine configured in accordance with an embodiment of the invention. The design is based on a custom programmable state machine with independent local memory. The memory is typically static random access memory (SRAM), but can be of a different type. Programming the state machine is done by writing content to a control store memory 406. The functionality of the rule engine 204 is changed by writing new microcode to the control store 406. Bus implementations to enable reading from and writing to distributed local memory are well known in the art. It is also contemplated that the rule engine 204 can be implemented in various ways, such as using application specific integrated circuits (ASICs) or programmable logic devices (PLDs).

Each rule engine 204 may contain a small first-in first-out (FIFO) local buffer 400 to hold traffic segments received from the distribution circuit 202 while each rule engine 204 is processing a preceding segment. If present, this buffer indicates to the distribution logic via the advance line when it is able to accept additional segments.

The purpose of the local buffer is to prevent periods of time during which no data is available for processing by a rule engine 204 (stalls). The local buffer can be thought of as a fixed length window that slides over the input data. A traffic segment is provided to each rule engine 204 by the distribution circuit 202 when all rule engines 204 have asserted their advance lines, which indicates that the local buffers of all rule engines 204 have space for the traffic segment. Traffic segments already in the local buffers of rule engines 204 are available for processing in parallel by all rule engines 204. As a result, a rule engine 204 that has completed processing of a first traffic segment can immediately pull the next traffic segment from the local buffer, without being stalled by another rule engine 204 that has not yet completed processing of the first segment. Since there is a maximum number of comparisons, and thus processing cycles, required to apply a rule to a traffic segment, the size of this local buffer can be bounded. Typically, processing of a traffic segment by a rule engine 204 requires no more than two cycles. If two cycles is then set as the number of processing cycles for any traffic segment, sliding the window every two cycles by the number of bytes required to include the next traffic segment guarantees that none of the local buffers become full.

A condition logic block 402 indicates via an advance line when it is ready to receive the next segment of data from the input buffer 400 or directly from the distribution circuit 202. The condition logic 402 is configured by each line of microcode to perform one or more comparisons on the current segment and, based on the comparisons, to select the next state using a selector 404. The condition logic 402 and the selector 404 are included within a computation kernel 403. The condition logic 402 implements combinatorial operations as well as sequential logic, which depends on its internal state. In this embodiment, the next state is the address of the next microcode instruction to execute. In addition, the condition logic 402 sets the done, match, action, and override indications provided to the aggregation circuit 206. The aggregation logic can generate control signals to activate and deactivate the condition logic 402, or to provide rule feedback to the condition logic 402.

Each microcode line in the control store 406 determines what kind of comparisons to perform on the current traffic segment. Based on the comparison results, the microcode line also provides the address of the next microcode line to execute. In one embodiment, each line in the control store 406 includes four types of information:

1. Control bits (such as opcodes or configuration bits) that determine what type of comparisons are performed by the condition logic 402, and what internal state should be stored in internal state variables (flops and registers).
2. Values used by the comparisons. Comparison types include equality, membership in a set, range comparison, and more complex operations, such as counter comparisons that indicate whether a bit sequence has occurred more than 3 times in the previous 10 segments.
3. Addresses of subsequent addresses to execute based on the output of the condition logic 402. Depending on the result of the condition logic 402, one of multiple next addresses may be selected. Allowing more than one next address allows greater flexibility for implementing complex conditions, white saving clock cycles.
4. Control of internal state and primary outputs of the rule engine 204. For example, this can include whether to assert the done line, whether to advance to the next segment in the packet or to stay for another comparison involving the current segment, or whether to move immediately to the end of the current packet.

These different types of comparisons, along with the architecture, enable processing of both individual packets and streams of packets by the set of rule engines 204. A rule engine 204 can process a stream without actually fully reconstructing it in external system memory. Based on the microcode instructions, the rule engine 204 can make decisions that are based on a sequence of events that happen over time and are encapsulated in separate packets.

FIG. 6 shows an example of an execution sequence of microcode instructions to implement a comparison rule. The sequence of searches for a four-byte sequence "abcd" in two successive segments (each assumed to be 2 bytes), followed by a two-byte sequence with a value between "10" and "14" inclusive. For a twenty byte packet that is represented symbolically as "1234yzwxabcd12345678", the actual state transitions from the start of the packet until a decision is 0→1→1→1→1→1→2→3→4. When the rule engine 204 reaches state 4, it asserts both the done and match outputs to the aggregation circuit 206 in FIG. 2. If the packet data does not include the desired content, then as soon as the SEGMENT equals the two-byte packet separator "- -", there is an automatic transition to state 5. In state 5, the rule engine 204 asserts the done line and deasserts the match line.

The number of operations that can be executed in parallel on SEGMENT and their type depends on the specific hardware implementation, including the control store memory line width. This example assumes that the comparison of SEGMENT against a given value and the check of whether SEGMENT is within a given range can be done in parallel. Otherwise, the operations can be done in two separate consecutive clock cycles. For example, state 3 makes two checks in parallel and assumes that the three next address values can be specified in one control store memory line.

Figure 7:
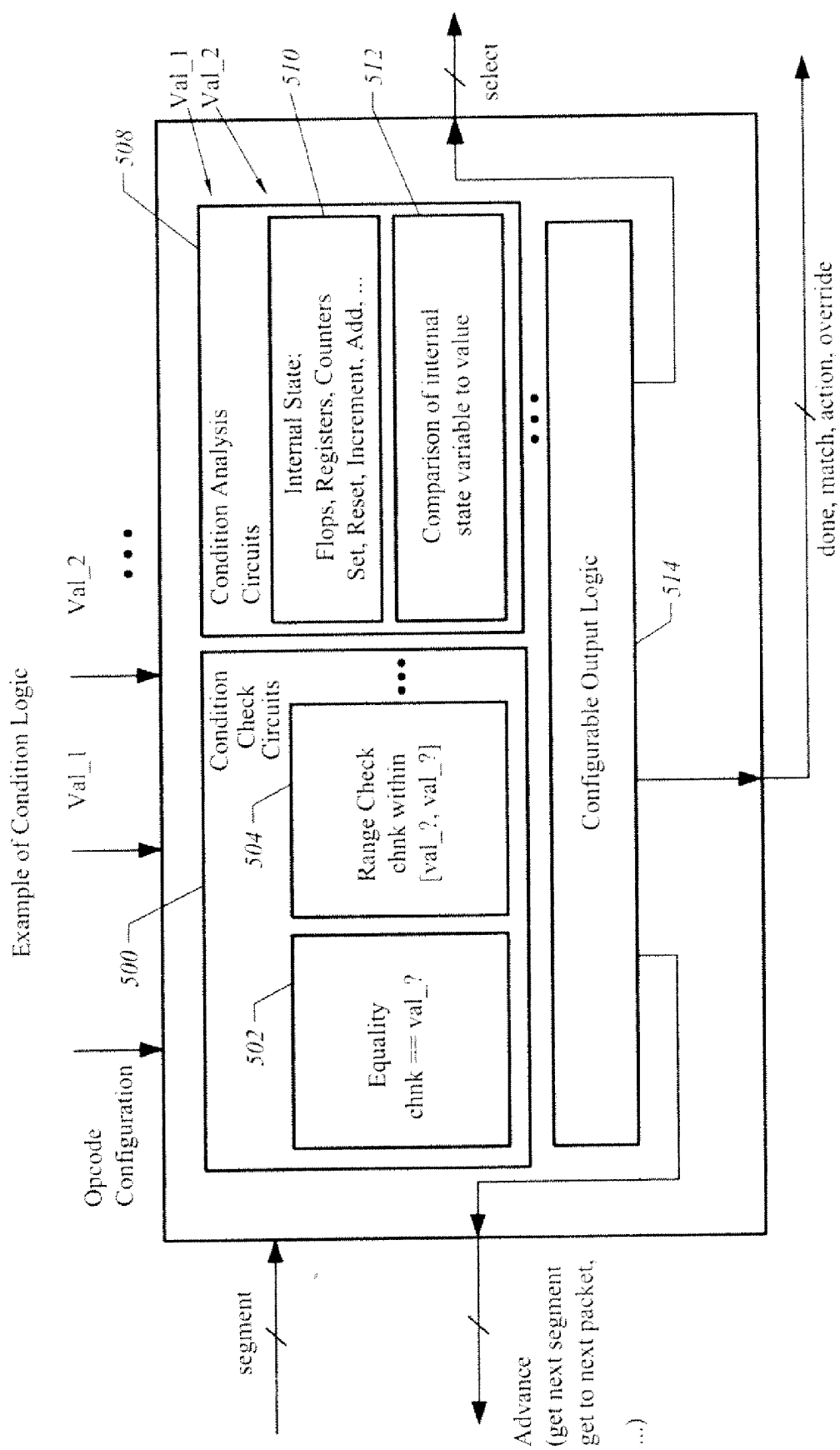
FIG. 7 illustrates an example of the internal architecture of the condition logic shown in FIG. 5.

FIG. 7 illustrates an example of the implementation of condition logic in FIG. 5. Based on the segment input from the local buffer 400 and the opcode and configuration bits from the control store 406, a set of comparisons can be done in parallel between the segment, operands, and internal state variables. An operand is a configured value used for a comparison. An internal state variable includes values stored in flops, registers, or counters, such as statistics. These values include the result of comparisons between stored values, such as the number of times that the value in a first counter has exceeded the value in a second counter. In this embodiment, each condition logic block 402 has two counters that are dedicated to count the number of packets and the total number of segments (or bytes) that have been processed by the microcode in the control store 406. There are also counters and status registers associated with the input, output, and management interfaces. Comparisons can be made between registers and local counters and/or global counters.

Each sub-block within FIG. 7 implements a specific comparison. Operand to data comparisons such as an equality 502 and a range check 504 are implemented by condition check circuits 500, which are used to evaluate signature-based rules. Modification of internal state stored in flops, registers, or counters 510 and comparisons between an internal state variable and an operand (or another internal state variable/register or a global state variable/counter) 512 are implemented by condition analysis circuits 508, which can be used to evaluate behavioral rules or to collect statistics. There is an automatic update of internal states, such as the number of bytes of the current packet that have been processed so far, as specified by the opcode and configuration inputs. The results of the parallel sub-block comparisons are compounded by a block within a configurable output logic block 514 (Boolean or sequential or both.) The select of the next address used by the selector 404 and the outputs of the microcode controlled state machines visible to the aggregation circuit 206 are set by the configurable output logic 514.

Embodiments of this invention enable modification of network traffic that may have bitwise granularity (be granular to the bit) anywhere within the network traffic. Network traffic in the form of packets may be modified anywhere in the packet header or payload. These modifications to the packet header or payload may include changes of one or more existing bits, insertion of one or more bits, and removal of one or more bits. It is also contemplated that embodiments of this invention enable selective mirroring of input traffic with bitwise granularity, so that only traffic that needs to be looked at in detail is directed to an entity with a slower packet processing rate such as a CPU or sniffer.

Figure 8:
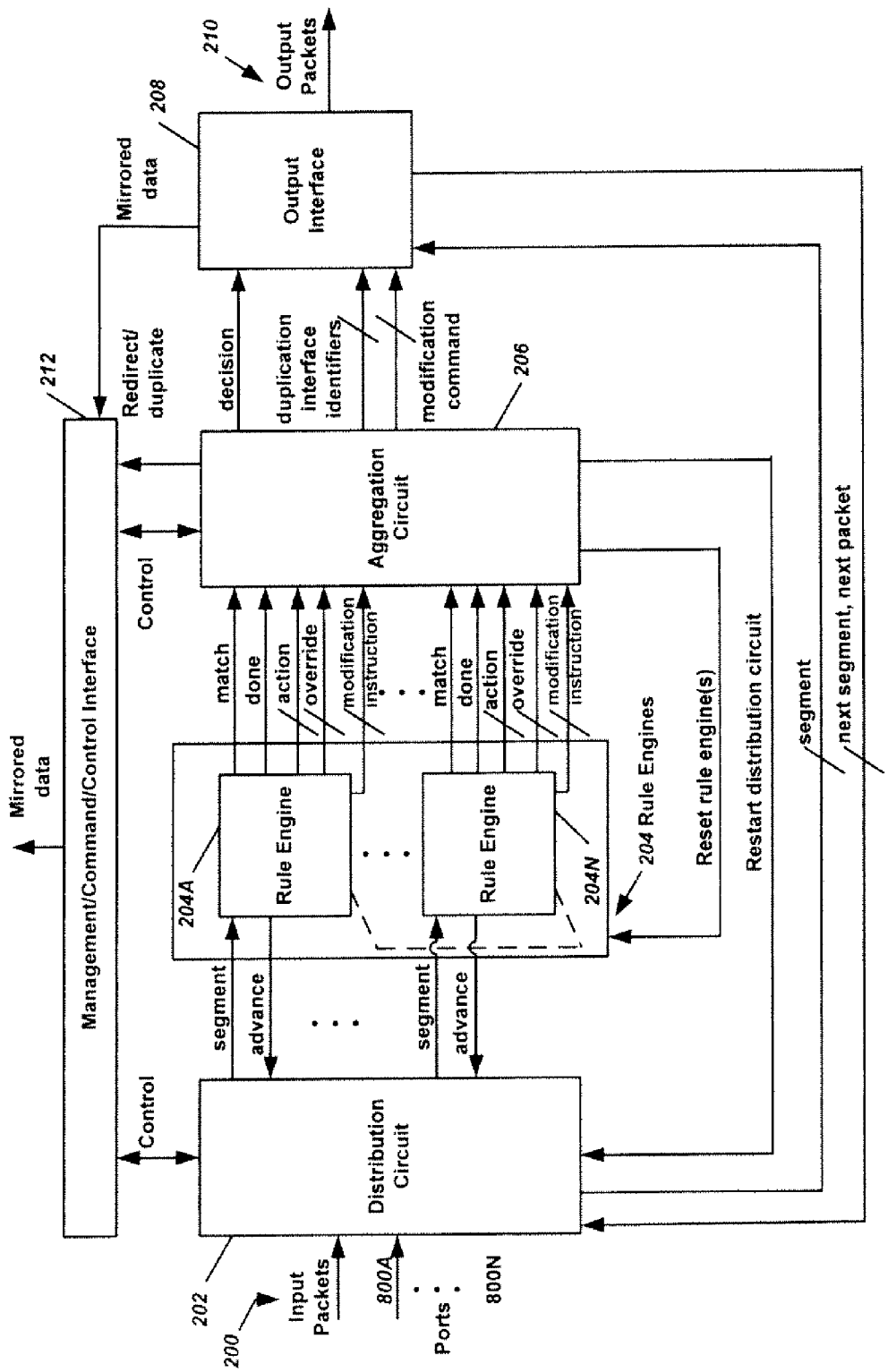
FIG. 8 illustrates a logical block diagram of the architecture of embodiments of the invention that support granular traffic modifications and mirroring.

FIG. 8 illustrates a logical block diagram of the architecture of embodiments of the invention that support granular traffic modifications and mirroring. The description of FIG. 2 applies to FIG. 8. The input packets 200 enter the distribution circuit 202 via a set of ports 800A-800N. The ports 800 may be distinct physical ports to a device including the architecture shown in FIG. 8, or may be logical ports within a single stream of traffic. The logical port to which input packets 200 belongs may be determined by applying a rule such as a signature-based rule, a behavioral rule, or a combination of signature-based and behavioral rules to input packets 200.

After completing evaluation of a rule for a data segment corresponding to one or more input packets 200, each rule engine 204 notifies the aggregation circuit 206 via modification instruction lines of modifications to be made to each packet in the data segment. The modification instructions indicated by a rule engine 204A may be identical to or overlap the modification instructions indicated by one or more of the other rule engines 204B-204N. Logic in the aggregation circuit 206 that may include both sequential and combinatorial logic combines the modification instructions indicated by the rule engines 204 into a modification command that includes indications of all modifications to be made to each packet in the data segment. When combining the modification instructions indicated by the rule engines 204 into the modification command, the aggregation circuit 206 may remove or modify modification instructions to eliminate redundancy.

For each packet in the data segment, the output interface 208 typically responds to a modification command from the aggregation circuit 206 if the output interface 208 has received indications by the aggregation circuit 206 on the decision line that the packet be forwarded, redirected, or duplicated. As the output circuit 208 receives traffic segments from the distribution circuit 202 in response to the next packet and next segment indications, the output circuit 208 may buffer some or all of a packet to facilitate the modification of the packet by the output circuit 208. The output circuit 208 may contain memory that stores the modification command or a processed version of the modification command. As part of packet modification, the output circuit 208 may modify fields in the packet used for error detection or error correction, such as a frame check sequence (FCS) or cyclic redundancy check (CRC) field for the header, the payload, or the entire packet. If the output circuit 208 is inserting fields in a packet or encapsulating a packet with a new header, one or more new fields for error detection or error correction may be added to the packet.

Based on the outputs of the rule engines 204, the aggregation circuit 206 uses the duplication interface identifier lines to indicate to the output interface 208 that a packet is being redirected or duplicated, and the interface or interfaces to which the packet is being sent. The redirected or duplicated packet may be modified by the output interface 208. Mirrored data may correspond to one or more ports 800 that may be any combination of physical and logical ports. Mirrored data may be data redirected to the management interface 212 from the output interface 208 or duplicated data directed to the management interface 212 and also forwarded from the output interface 208. Some combination of the output interface 208 and the management interface 212 may have a limited amount of memory to rate match traffic segments entering the output interface 208 from the distribution circuit 202 to the output of the management interface 212. Any rate matching may also be performed by external devices connected to the management interface 212. The output of the management interface 212 may combine mirrored data and management or control communications.

Packet modifications may facilitate network security and monitoring, such as by enabling selective monitoring of suspicious traffic, preventing attacks, or mitigating ongoing attacks. For example, input packets 200 in FIG. 8 with a non-standard or unassigned TCP port number may be modified, using the architecture shown in FIG. 8, into output packets 210 with a TCP port number mapped to a downstream secure application for monitoring. Input packets 200 from unknown sources with unauthorized Internet Protocol (IP) options may be modified into output packets 210 with, for example, the IP options deleted or modified to be non-operative to prevent or mitigate attacks. Input packets 200 with spoofed IP addresses may be modified into output packets 210 with the IP address of a downstream monitoring device.

This modification may also facilitate traffic management in addition to or independently of facilitating network security. For example, input packets 200 may be modified into output packets 210 with an inserted virtual local area network (VLAN) tag or with a multi-protocol label switching (MPLS) tag that may correspond to the customer sending the input packets 200, to a specific LAN segment in the case of the VLAN tag, or to a specific MPLS tunnel in the case of the MPLS tag. This is an example of packet tagging. Input packets 200 may be modified into output packets 210 with a removed or modified VLAN tag or MPLS tag. Input packets 200 may also be modified into output packets 210 with a multi-protocol label switching (MPLS) tag containing a quality of service marking that indicates the type of processing that this packet must receive from downstream devices. This operation is an example of packet coloring.

This modification may also facilitate integration of devices within a system. For example, input packets 200 may be modified into output packets 210 that have an encapsulated header. This encapsulated header may convey control information of meaning to a particular downstream device. One common purpose of header encapsulation is to indicate the results of pre-processing of input packets 200 by a device with the architecture shown in FIG. 8 so that downstream devices such as NPs that receive output packets 210 need not repeat the same processing, saving computational resources and improving network performance.

Mirroring is used to direct input traffic to an entity such as a CPU or sniffer for detailed traffic monitoring and analysis. Selective mirroring across the input ports 800 is desirable because a CPU or sniffer generally cannot process packets at the same rate as the architecture of FIG. 8, which is designed for high-speed, multi-gigabit per second data rates. Accordingly, only traffic that needs to be looked at in detail should be directed to an entity such as a CPU or sniffer.

Mirroring with bitwise granularity enables selective, precise, surgical mirroring. Use of the architecture shown in FIG. 8 to flexibly filter high-speed traffic enables a CPU or sniffer to be used for precisely targeted traffic sent out the management interface 212. There is also no restriction on the types of the ports 800, such as a physical port or a logical port defined by a virtual LAN, that may be mirrored to the management interface 212. For example, it may be desirable to inspect only packets reporting stock quotes or from a particular website. The deep packet inspection supported by the architecture of FIG. 8 enables application of rules including signature-based rules, where the signature can appear in the header or payload of individual packets, or across a sequence of packets. Behavioral rules may also be integrated with signature-based rules to define the criteria for selective mirroring. The filtering of high-speed traffic using a combination of signature-based and behavioral rules may be adapted to generate a system level solution that best leverages the processing capabilities of the CPU or the sniffer, without requiring costly NPs or CAMs. For example, the architecture of FIG. 8 may apply an inclusive signature-based rule for mirrored traffic if the mirrored traffic load is substantially less than the maximum processing capability of the sniffer, and may apply progressively stricter signature-based rules as the mirrored traffic load approaches the maximum processing capability of the sniffer.

The architecture of FIG. 8 is hardware-based and optimized for header analysis, deep packet inspection, and packet modification applications. In particular, the architecture does not incorporate designs of general purpose components such as CPUs. To avoid an intrusive re-design of the hardware, registers, and low-level software of NPs and switches, a simple way to incorporate this architecture into existing off-the-shelf components is to integrate the architecture into a component at the physical layer (PHY) or at a combination of the PHY and media access control sublayer (MAC) of the seven-layer Open Systems Interconnection (OSI) reference model for networking protocol layers. These layers, moving upwards from raw bits on a communication channel to application protocols commonly used by end users, include the physical layer, the data link layer, the network layer, the transport layer, the session layer, the presentation layer, and the application layer. The partitoning of the layers of the OSI reference model is based on principles including clear definition of the functions performed by each layer, abstraction of layers to minimize inter-layer dependencies, and facilitation of the definition of standards.

Figure 9:
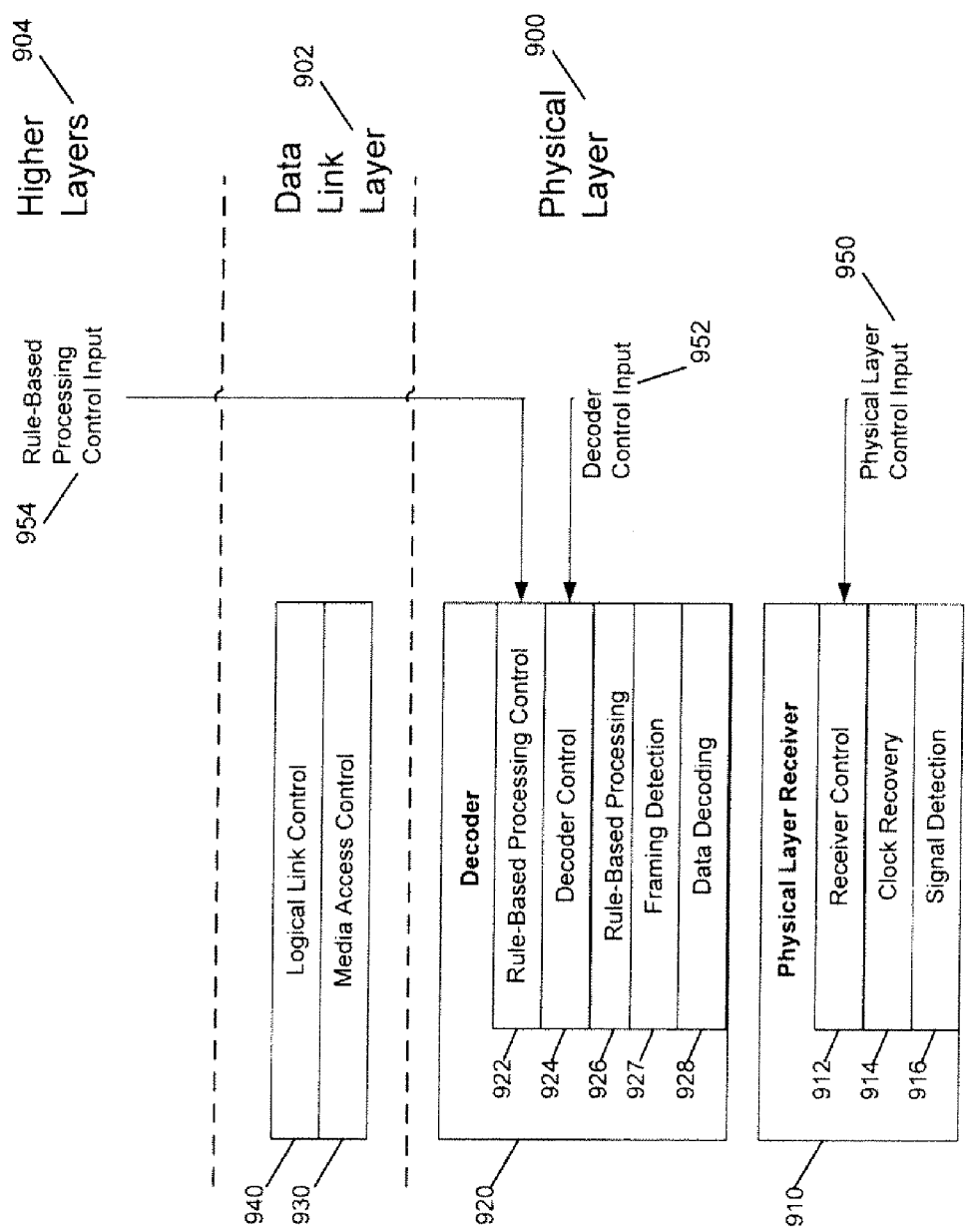
FIG. 9 illustrates a functional diagram of a physical layer interface that performs processing based on rules conditioned on higher layer information.

FIG. 9 illustrates a functional diagram of a physical layer interface that performs processing based on rules conditioned on higher layer information. The physical layer 900 may include a physical layer receiver 910 and a decoder 920. The physical layer receiver 910 performs functions including signal detection 916 and clock recovery 914 to receive signals and to detect digital or analog information from those signals. The physical layer receiver 910 also accepts receiver control input 950, such as provisioning and configuration, and applies that input using a receiver control function 912 to control functions including the signal detection 916 and the clock recovery 914. The receiver control input 950 may be communicated to the physical layer receiver 910 using a well-known bus communication protocol such as I2C, which is commonly used for configuring physical layer devices. The functions signal detection 916, clock recovery 914, and receiver control 912 are physical layer functions that are dependent on factors including the characteristics of each individual physical medium, such as attenuation and dispersion, and the characteristics of the supported communication, such as bit rate and signal frequency.

The decoder 920 performs functions including data decoding 928, framing detection 927, and rule-based processing 926. Data decoding 928 includes processing of the data detected by the physical layer receiver 910 to extract data meaningful to the data link layer 902. Data decoding 928 may be needed to process data encoded using methods including error detection coding, error correction coding, and direct current (DC) balancing coding that improve communication quality by compensating for characteristics of the physical medium. Framing detection 927 may be needed to detect an indication of start of frame that may be passed to the data link layer 902. The decoder 920 also accepts decoder control input 952, such as provisioning and configuration, and applies that input using a decoder control function 924 to control functions including the data decoding 928 and the framing detection 927. The decoder control input 952 may be communicated to the decoder 920 using I2C.

Data decoding 928 and framing detection 927 may be functions of the physical layer 900 or of the data link layer 902. In well known Institute of Electrical and Electronics Engineers (IEEE) standard protocols such as Gigabit Ethernet (IEEE 802.3z-1998) and 10 Gb/s Ethernet (IEEE 802.3ac-2002), data decoding 928 and framing detection 927 are included within variants of the physical coding sublayer within the physical layer, so that the data link layer 902 (Ethernet in this case) may be abstracted from the different methods of data encoding used for different physical layers. For data link layer protocols that are not used on a variety of physical layers, data decoding 928 and framing detection 927 may be considered part of the data link layer 902 because there is less concern about perturbing the data link layer 902 due to changes in the physical layer 900.

Rule-based processing 926 refers to the application of provisioned rules, including signature-based and behavioral rules, to input packets 200 using the architecture shown in FIG. 2 and FIG. 8. These rules may depend on bits anywhere within the header and the payload of input packets 200. These rules may also result in the modification of portions of the packet. Since the physical layer 900 has little or no awareness of the internal structure of packets or frames, the rule-based processing 926 depends on information from networking protocol layers above the physical layer 900. Most rule-based processing 926, such as rule-based processing dependent on IP headers, TCP headers, or payload information, also depends on information from networking protocol layers above the data link layer 902. The decoder 920 accepts rule-based processing control input 954, such as provisioning and configuration, and applies that input using a rule-based processing control function 922 to control functions including the rule-based processing 926. The rule-based processing control input 954 may be communicated to the decoder 920 using I2C.

The application of rule-based processing 926 at the physical layer 900 or the data link layer 902 is facilitated by the framing detection 927, which indicates to the rule-based processing 926 that each input packet 200 (shown in FIG. 2 and FIG. 8) is starting. This framing indication indicates to the distribution circuit 202 or to a pre-processor preceding the distribution circuit where to start when dividing each input packet 200 into traffic segments. In well known protocols such as Gigabit Ethernet and 10 Gb/s Ethernet, the physical layer performs the framing detection 927, so it is straightforward to integrate rule-based processing 926 based on rules conditioned on higher layer information at the physical layer.

Rule-based processing 926 based on rules conditioned on higher layer information may also be integrated at the data link layer 902, since the framing detection 927, if not performed at the physical layer 900, is performed at the data link layer 902. One approach is to integrate rule-based processing 926 within the media access control sublayer 930. The media access control sublayer 930 deals with functions specific to a particular type of LAN. The logical link control sublayer 940 enables multiple higher-layer protocols to use a given media access control sublayer 930. NPs are typically designed to be operable across multiple types of LANs, and therefore often interface to lower layer devices at the interface between the media access control sublayer 930 and the logical link control sublayer 940.

Figure 10:
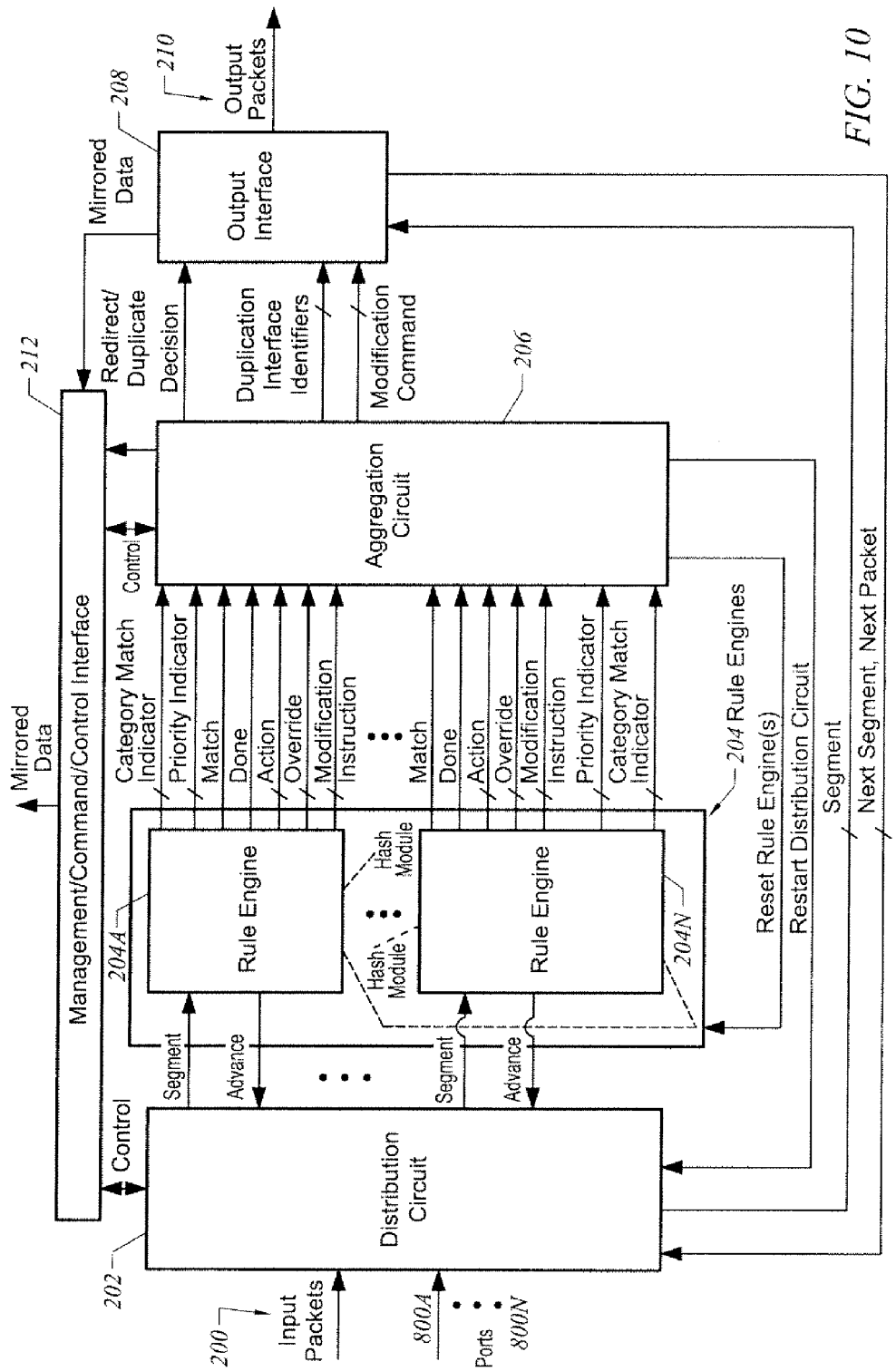
FIG. 10 illustrates a logical block diagram of the architecture of embodiments of the invention that support prioritized matching, biased sampling of network traffic, and categorization of network traffic to facilitate application level processing.

FIG. 10 illustrates a logical block diagram of the architecture of embodiments of the invention that support prioritized matching and categorization of network traffic, biased and weighted sampling of network traffic, and association of categorization information with network traffic to facilitate application level processing. The descriptions of FIGS. 2 and 8 apply to FIG. 10. Each rule engine 204 evaluates a rule for a data segment corresponding to network input data 200. Network input data 200 may be divided into network data units, where an example of a network data unit is a packet. If the rule processed by a rule engine 204 evaluates to true, the match line from the rule engine 204 to the aggregation circuit 206 is asserted. In addition, the rule engine 204 notifies the aggregation circuit 206 via priority indicator lines of information related to the priority of the match. The priority indicator may include a block index associated with the match, where the block index may refer to a location in memory. The block index may be used to directly look up information related to the match, such as the priority of the match and/or the output reporting categories to which the match corresponds. The block index itself may also indicate the priority of the match. For example, the lowest block index can be associated with the highest priority match, and increasing block index values can correspond to decreasing priority, or vice versa.

In one embodiment, the aggregation circuit 206 receives done, match, and corresponding priority indicators from multiple rule engines 204 in parallel. After providing done, match, and corresponding priority indicators to the aggregation circuit 206, each rule engine 204 asserts an advance indication to the distribution circuit 202. When the rule engines 204 have asserted their advance lines, the distribution circuit 202 sends the next traffic segment to the rule engines 204. This enables the pipelining of the execution of the rule engines 204 and the aggregation circuit 206.

Figure 11:
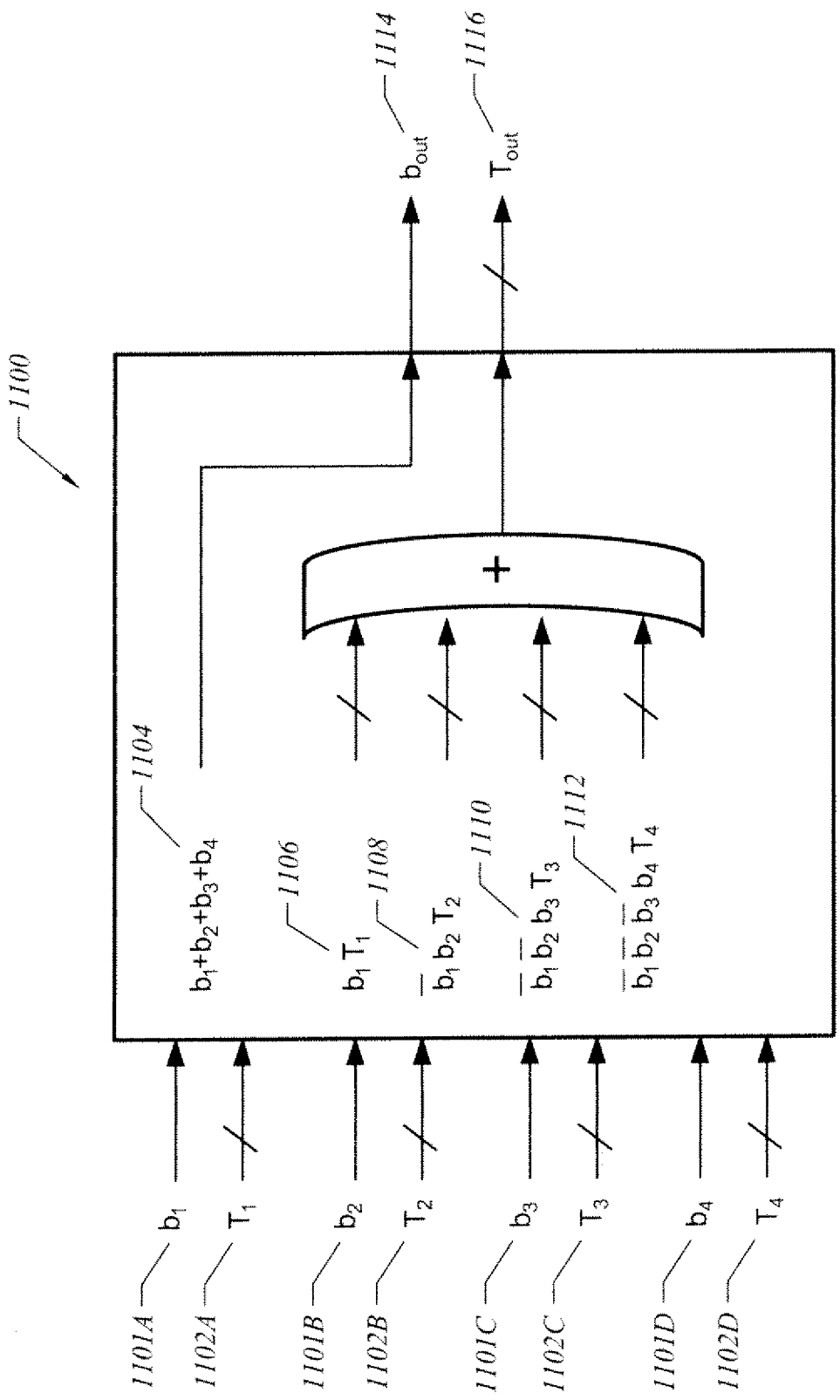
FIG. 11 illustrates a logical block diagram of four-way logic for selecting the priority indicator of the highest priority match from among four input priority indicators, in accordance with one embodiment of the invention.
Figure 12:
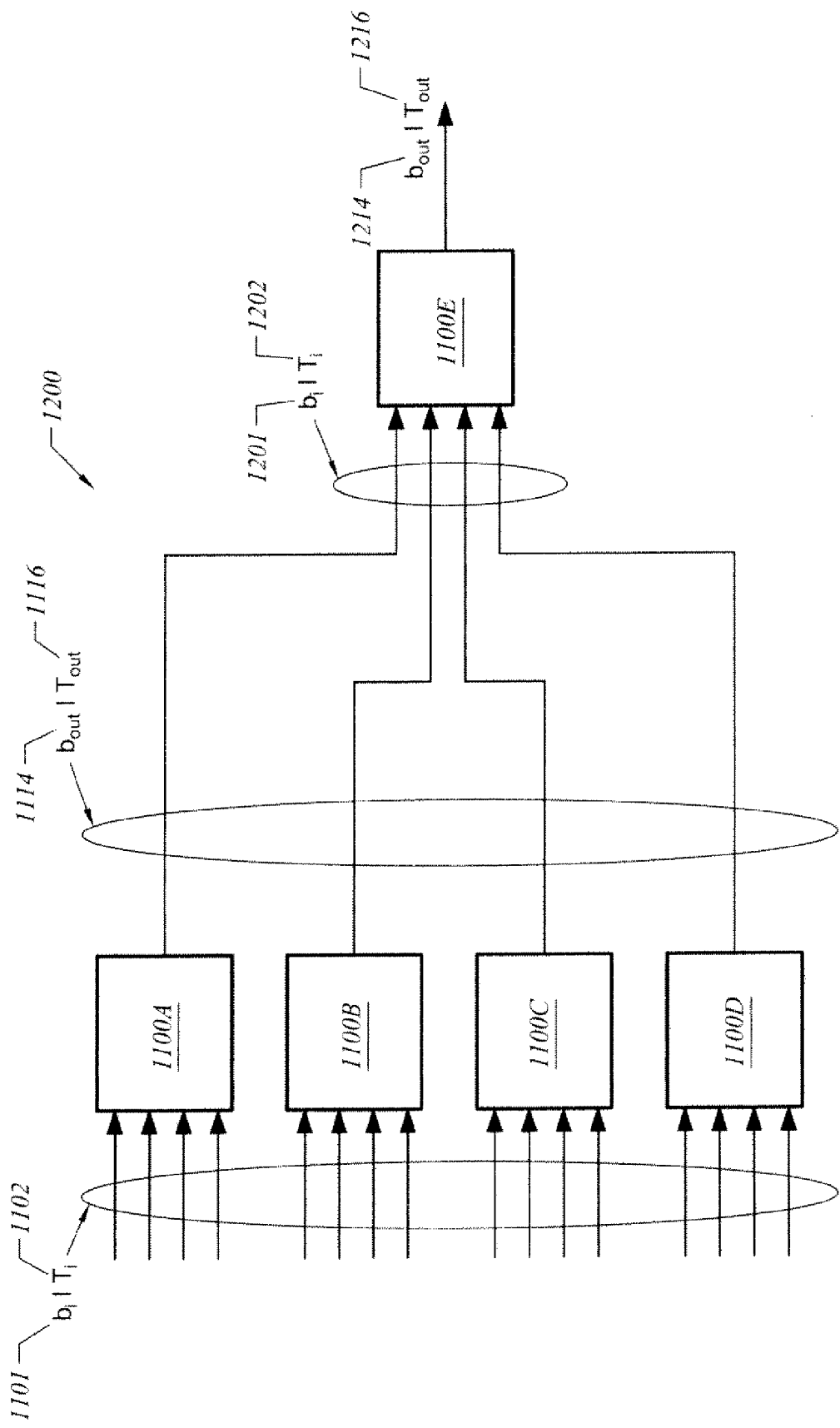
FIG. 12 illustrates a logical block diagram of multi-stage logic where each stage includes the four-way logic of FIG. 11, in accordance with one embodiment of the invention.

In one embodiment, the aggregation circuit 206 includes logic to select one or more of the matches based on the corresponding priority indicators. If more than one match is selected, the matches may be prioritized. For example, if two matches are selected, there may be a highest priority match and a second highest priority match. The aggregation circuit 206 may compare the priority indicators to determine the relative priority of the matches. FIGS. 11 and 12 illustrate examples of logical block diagrams of this logic. After selecting one or more of the matches, the aggregation circuit 206 may decide to forward, mirror, redirect, and/or duplicate the corresponding network data unit, or may decide to drop the corresponding network data unit. The aggregation circuit 206 may also decide to modify the corresponding network data unit. The aggregation circuit 206 may make these decisions based on one or more of the prioritized matches, such as by logically combining the action indicators corresponding to the selected matches. The aggregation circuit 206 may provide information corresponding to the selected matches, such as the priority indicators of the selected matches, to an external interface. For example, the aggregation circuit 206 may provide the priority indicators of the selected matches to the management interface 212 when the corresponding network data unit is being mirrored, redirected, and/or duplicated.

FIG. 11 illustrates a logical block diagram of four-way logic 1100 for selecting the priority indicator 1116 of the highest priority match from among four input priority indicators 1102A-1102D, in accordance with one embodiment of the invention. One of ordinary skill in the art will understand that logic for selecting the priority indicator of the highest priority match can have more or fewer than four inputs. Rule engines 204A-204D provide match indicators 1101A-1101D ($b_1$-$b_4$) and corresponding priority indicators 1102A-1102D ($T_1$-$T_4$) as inputs to four-way logic 1100. The output match indicator 1114 can be evaluated based on logic expression 1104, the result of which is that the output match indicator 1114 evaluates to true if any of the input match indicators 1101 are true. The priority indicator 1116 of the highest priority match can be evaluated based on the vector "OR" of logic expressions 1106, 1108, 1110, and 1112, the result of which is that the output priority indicator 1116 evaluates to priority indicator 1102A if match indicator 1101A is true, priority indicator 1102B if match indicator 1101B is true and match indicator 1101A is false, and so on as indicated in FIG. 11. In one example, this approach to selecting priority indicator 1116 may assume that priority indicators 1102A-1102D are in decreasing priority order. If priority indicators 1102A-1102D are block index values and increasing block index values correspond to decreasing priority, then priority indicators 1102A-1102D should be ordered based on increasing block index values. This ordering of priority indicators 1102A-1102D can be ensured by, for example, configuring rule engines 204A-204D so that the rules applied by rule engines 204A-204D correspond to increasing block index values.

Alternatively, the priority indicator 1116 of the highest priority match can be evaluated based on vector compares of priority indicators 1102A-1102D so that, for example, the priority indicator 1116 evaluates to the lowest of priority indicators 1102A-1102D. In this embodiment, the priority indicators 1102A-1102D may be in any order. The use of vector compares enables the priority indicator 1116 to be evaluated from the priority indicators 1102A-1102D irrespective of the ordering of the priority indicators 1102A-1102D.

FIG. 12 illustrates a logical block diagram of multi-stage logic 1200 where each stage includes the four-way logic 1100 of FIG. 11, in accordance with one embodiment of the invention. For example, multi-stage logic 1200 can include four-way logic modules 1100A-1100E in two stages. The first stage includes four-way logic modules 1100A-1100D, each with four input match indicators 1101 and four corresponding input priority indicators 1102, and each with an output match indicator 1114 and a corresponding output priority indicator 1116. The four output match indicators 1114 of the first stage are applied to the second stage. The second stage includes four-way logic module 1100E, with four input match indicators 1201 and four corresponding input priority indicators 1202, and with an output match indicator 1214 and a corresponding output priority indicator 1216. In this way, the priority indicator 1216 of the highest priority match can be selected from sixteen input priority indicators 1102. Additional logic blocks 1100 and/or additional stages can be added for a larger number of input priority indicators 1102.

One of ordinary skill in the art will understand that logic can also be designed to select a subset of multiple priority indicators from among the set of input priority indicators corresponding to matches. For example, logic can be designed to select the highest and second highest priority indicators, or any other subset including two or more priority indicators. This logic can use vector compares or vector "ORs" in an analogous fashion to that described in FIG. 11, and can be cascaded in stages in an analogous fashion to that described in FIG. 12.

In another embodiment, the rule engines 204 may be cascaded in stages so that a first subset of rule engines 204 applies rules to incoming segments to determine match and corresponding priority indicators, and a second subset of rule engines 204 receives these match and corresponding priority indicators. The second subset of rule engines 204 is programmed to select one or more of the matches based on the corresponding priority indicators. The first subset of rule engines 204 can preserve match and corresponding priority information as part of the earlier described global state table available to all rule engines 204, and the second subset of rule engines 204 can access this information from the global state table. The second subset of rule engines 204 can be further divided into stages in a similar way to that described in FIG. 12. The match and priority indicators at the output of a first stage can also be stored as part of the global state table so that this information can be accessed by rule engines 204 in the second stage. The same applies for subsequent stages. The multiple stages of rule engines 204 can also be pipelined. For example, if the processing by the second subset of rule engines 204 is designed to take the same or fewer processing cycles than the processing by the first subset of rule engines, each of the first subset of rule engines 204 can assert an advance indication to the distribution circuit 202 after preserving match and corresponding priority information in the global state table for the second subset of rule engines 204.

One potential application of prioritized matching is intrusion detection in networks. Multiple rule engines 204 can apply multiple rules to detect one or more types of attacks and other unauthorized activity based on signatures across one or more network data units and/or behavioral changes in the network. It can be important to find the full set of matches to these multiple rules to detect multiple different types of unauthorized activity that may be occurring simultaneously, since multiple types of responses by the network may be necessary. It can also be important to prioritize the matches. For example, it may be important to act immediately in response to certain types of unauthorized activity that are time-critical. In contrast, it may be desirable to monitor other types of unauthorized activity for a period of time before taking action. To ensure that the appropriate actions are taken in the appropriate order, matches indicating time-critical unauthorized activity may be treated as higher priority than other types of unauthorized activity.

Reporting information corresponding to the matches to a management system via the management interface 212 is also desirable. However, it may be difficult to report information corresponding to each of what can be a large and highly variable set of matches. It can therefore be desirable to categorize the information into a known set of categories and to report the categorized information. A category corresponds to some property or attribute of network data and/or behavioral changes in a network. For example, a category may include network data and/or behavioral changes in a network corresponding to a union of matches, where each match is determined based on one or more rules. The set of categories may be fixed, or may be configurable.

Referring back to FIG. 10, each rule engine 204 that applies a rule to one or more incoming segments to determine match and priority indicators is configured with at least one category match indicator corresponding to the rule. If the application of a rule results in a match, a rule engine 204 can include the category match indicators corresponding to the rule in the priority indicator, or can provide the category match indicator separately from the priority indicator. Each category match indicator can be associated with a category. In one embodiment, a category match indicator may be associated with a packet type or a packet flow.

In one embodiment, the aggregation circuit 206 accesses one or more priority indicators corresponding to matches. For example, the aggregation circuit 206 may select the one or more highest priority indicators. The aggregation circuit 206 may then extract a vector of one or more category match indicators from each selected priority indicator, or may access the vector of category match indicators separately from each selected priority indicator. The aggregation circuit 206 may then logically combine the extracted category match indicator vectors to obtain combined category match information. The aggregation circuit 206 may then report the combined category match information to a management system via the management interface 212.

In another embodiment, the aggregation circuit 206 accesses one or more category match indicators received from one or more rule engines 204. Each category match indicator corresponds to a priority indicator. The aggregation circuit 206 may then logically combine the extracted category match indicator vectors to obtain combined category match information. The aggregation circuit 206 may then report the combined category match information to a management system via the management interface 212.

Figure 13:
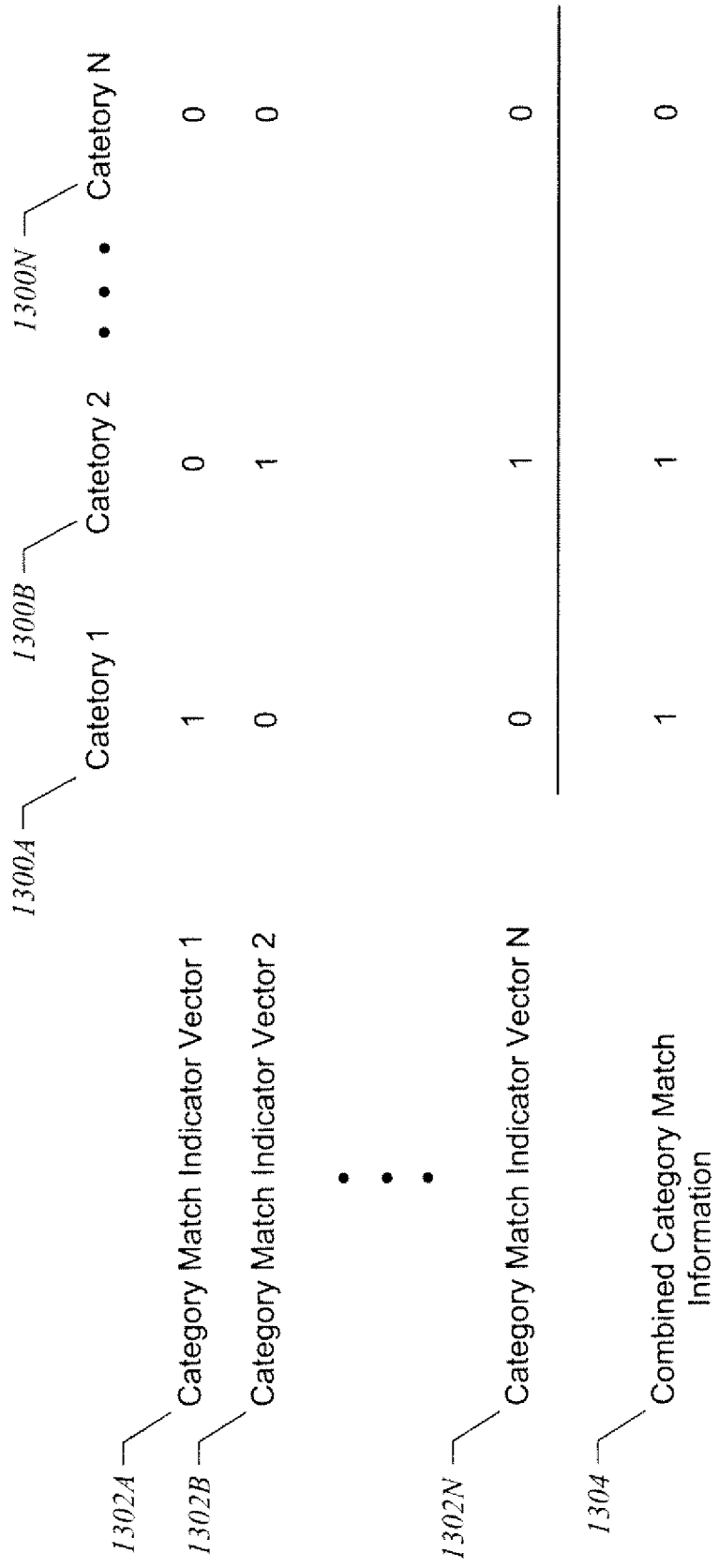
FIG. 13 illustrates an example of combined category match information obtained from category match indicator vectors.

FIG. 13 illustrates an example of combined category match information 1304 obtained from category match indicator vectors 1302A-1302N. Each category match indicator vector 1302 indicates whether a match determined by a rule engine 204 falls into categories 1300A-1300N. In this example, the aggregation circuit 206 evaluates a vector "OR" of the category match indicator vectors 1302 to obtain the combined category match information 1304. The effect of the vector "OR" is that if any category match indicator vector 1302 evaluates to 1 ("TRUE") for a category 1300, then the combined category match information evaluates to 1 ("TRUE") for that category 1300.

Referring back to FIGS. 8 and 10, the network device that determines the priority indicators and/or the category match indicators may pass those indicators to other devices in the network. For example, one or more of the priority indicators and/or the category match indicators corresponding to an input packet 800A may be appended to the input packet 800A via a modification command to the output interface 208 from the aggregation circuit 206. Alternatively, the output interface 208 may generate one or more packets in response to the modification command, where each packet includes one or more of the priority indicators and/or the category match indicators. One benefit of passing priority indicators and/or category match indicators to other devices in the network is so that the network traffic processing and analysis capabilities of an upstream device can be leveraged by downstream devices. The downstream devices may not have the same traffic processing and analysis capabilities as the upstream device. The downstream devices also may leverage the received priority indicators and/or category match indicators to simplify and streamline the network traffic processing and analysis performed at the downstream devices.

In another aspect of the invention, biased and weighted sampling of network traffic can facilitate network traffic monitoring. Network traffic monitoring is important for a wide range of network capabilities, such as intrusion detection and monitoring of service level agreements (SLAs). Network traffic monitoring may involve offline analysis of network traffic, such as analysis by a control processor performing management system functions. As the control processor is not part of the data path, this analysis is typically not at wire speed. A common approach used to select network data units for offline analysis is to uniformly sample network traffic. For example, every tenth network data unit traversing the data path can be mirrored and/or duplicated to the control processor. One problem with using the same sampling rate across all network traffic is that there is a significant likelihood of missing low-frequency and/or short duration occurrences in the packet traffic that may signal certain types of attacks or other unauthorized behavior.

A way to address this problem is to perform sampling at different rates for particular subsets of the network traffic, while continuing, for example, to sample every tenth packet for the remainder of the network traffic. For example, all login packets may be examined so that short duration, individual login events are not missed. More generally, the sampling may select m out of n network data units from any subset of network data units, where m is an integer value between 1 and n−1 inclusive. A subset of network data units corresponds to some property or attribute of network data and/or behavioral changes in a network. In one embodiment, each rule engine 204 in FIG. 10 may be configured via the management interface 212 with sampling information associated with a rule. The rule may have bitwise granularity across the packet header and the packet payload. The sampling information may be a sampling frequency, and may be associated with a packet type, a packet flow, or more generally, any subset of network data units sharing a property or attribute. Upon determining a match, each rule engine 204 can determine instructions, such as instructions represented by the action indicator, based on the sampling information. For example, for a sampling frequency of m per n network data units, a rule engine 204 can indicate via the action indicator to mirror, redirect, and/or duplicate m of every n network data units that result in a match. Each rule engine 204 may include condition analysis circuits 508 (FIGS. 5 and 7) that can be used to compare the count of matches to a value associated with the sampling frequency, such as a multiple of the sampling period. In one embodiment, the aggregation circuit 206 generates routing instructions for a network data unit that includes the instructions represented by the action indicator. The output circuit 208 may provide the network data unit to the management interface 212 in response to the routing instructions.

In another aspect of the invention, categorization information can be associated with network traffic to facilitate application level processing. For example, offline analysis of network traffic can be facilitated by categorization of network data units prior to the forwarding of those packets to, for example, the application level of a control processor. One aspect of the categorization is, as described above, to apply rules to determine which network data units to forward to the application level. The forwarding to the application level may be through mirroring, redirection, and/or duplication. This reduces the total number of network data units forwarded to the application level. However, it is also desirable to facilitate application level processing of each network data unit. Therefore, it is desirable to associate this categorization information with each network data unit so that the application can easily and quickly access the categorization information. This can increase processing speed and reduce application complexity.

Figure 14:
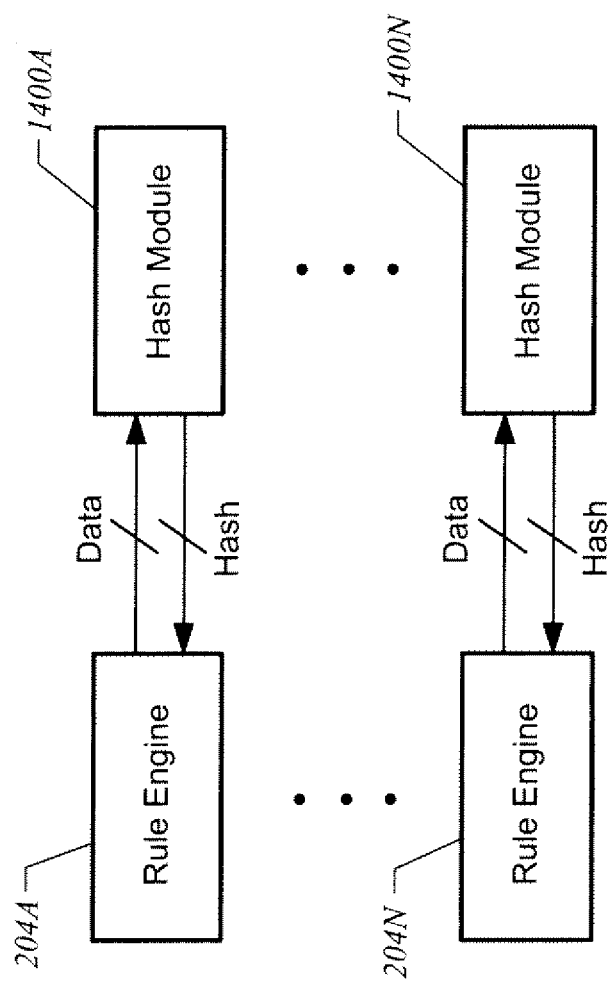
FIG. 14 illustrates a logical block diagram of the interface between rule engines and their associated hash modules, in accordance with one embodiment of the invention.

In one embodiment, the categorization information may be in the form of a hash identifier. Each rule engine 204 shown in FIG. 10 may interface to an associated hash module. FIG. 14 illustrates a logical block diagram of the interface between rule engines 204 and their associated hash modules 1400, in accordance with one embodiment of the invention. Each rule engine 204 can apply a rule to extract one or more fields from an input network data unit, such as an input packet. The rule may have bitwise granularity across the header and payload of the packet, so that the extracted fields may have bitwise granularity and be from any portion of the packet. Bach rule engine 204 provides the extracted fields to a hash module 1400. Each hash module 1400 processes the data to generate a hash identifier that is desirably of lesser width in bits than the extracted fields provided to the hash module 1400, and provides the hash identifier back to the rule engine 204 that provided the extracted fields. The hash identifier may be associated with a packet type or packet flow, or more generally, with any subset of network data units sharing a property or attribute. Each hash module 1400 may be configured via the management interface 212.

Alternatively, each rule engine 204 may generate the hash identifier as part of its processing of input network data units. In this case, the function of the hash modules 1400 is performed by the rule engines 204, making separate hash modules 1400 unnecessary.

In one embodiment, each rule engine 204 can apply a rule to produce modification instructions based on the categorization information, such as the hash identifier. The modification instructions may include the hash identifier. The aggregation circuit 206 can combine the modification instructions indicated by the rule engines 204 into a modification command that is provided to the output circuit 208, as described previously. Based on the modification command, the output circuit 208 can append the hash identifier to the network data unit. The hash identifier may be added to any part of the network data unit, such as the header. Based on the routing decision of the aggregation circuit 206, the output circuit 208 can provide the modified network data unit to a management system via the management interface 212. The output circuit 208 may also transmit the modified network data unit to downstream devices. One benefit of attaching categorization information, such as a hash identifier, to a network data unit passed to other devices in the network is so that the network traffic processing and analysis capabilities of an upstream device can be leveraged by downstream devices. The downstream devices may not have the same traffic processing and analysis capabilities as the upstream device. The downstream devices also may leverage the categorization information associated with a received network data unit to simplify and streamline the network traffic processing and analysis performed at the downstream devices.

Embodiments of the invention are cost-effective, simple to use, manageable, and flexible. With a unified algorithm and block design across the distribution circuit 202, the rule engines 204, and the aggregation circuit 206, the apparatus performs header analysis, deep packet inspection, and packet modification functions without the use of multiple, costly co-processors such as NPs for header processing and packet modification and a CAM for pattern matching. The apparatus can be incrementally deployed to balance risk with the available budget. The apparatus may be integrated with and deployed as part of a physical layer, data link layer, or other lower layer interface to enable higher layer rule-based processing in cost-effective, low power devices that do not use any of the computational resources of NPs and CAMs. The architecture of the apparatus is adapted to header analysis, deep packet inspection, and packet modification at multi-Gb/s and higher input speeds. The apparatus provides an interface 212 for management and monitoring of the network, configuration of its specialized features, and output of mirrored data, and may also support the use of pre-processors and post-processors for specific customer needs.

Embodiments of the invention also have predictable and easily verifiable performance, based on its architecture. The implementation of the set of rule engines 204 as a pipelined fabric of microcode state machines that operate concurrently and collaboratively ensures that the worst-case throughput and latency through the apparatus can be calculated and bounded. As a result, accurate predictions can be made about when the apparatus can run at wire speed. Wire speed operation is fast enough to process, without unintended traffic loss, the worst case combination of input packet size and packet rate in packets per second given maximum rule complexity. Also, since there is a deterministic worst-case number of clock cycles for processing of any traffic segment by a rule engine 204, the apparatus can have small, bounded processing delay across mixes of traffic types, packet sizes, and rule complexity. Small, bounded delay means that simple, on-chip buffers can be used by the apparatus rather than external memory or caches that may require complex memory hierarchy or queuing structures. The use of simple on-chip buffers not only increases apparatus performance through efficient and optimal use of hardware resources such as gates and memory elements, but also avoids corner cases related to various traffic patterns. It also enables validation using formal verification and structural coverage, which reduces the likelihood of design escapes and errors.

It will be understood by one of ordinary skill in the art that the embodiments described in this specification may process various forms of network traffic, including but not limited to packets. For example, the embodiments described in this specification may process cells or frames.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus, comprising:
a plurality of microcode controlled state machines including a first microcode controlled state machine and a second microcode controlled state machine;
a distribution circuit that routes input data to the plurality of microcode controlled state machines such that the first microcode controlled state machine applies a first rule to the input data, the first rule being associated with a first data category, and the second microcode controlled state machine applies a second rule to the input data, the second rule being associated with a second data category different from the first data category, wherein:
the first microcode controlled state machine determines a first category match indicator vector including a first category match indicator associated with the first data category and a second category match indicator associated with the second data category, wherein the first category match indicator indicates, based on application of the first rule, if the input data is in the first data category; and
the second microcode controlled state machine determines a second category match indicator vector including a third category match indicator associated with the first data category and a fourth category match indicator associated with the second data category, wherein the fourth category match indicator indicates, based on application of the second rule, if the input data is in the second data category; and
a first circuit that generates combined category match information including a first logical combination of the first category match indicator and the third category match indicator, and a second logical combination of the second category match indicator and the fourth category match indicator;
wherein the first circuit appends the combined category match information to the input data.

2. The apparatus of claim 1, wherein the plurality of microcode controlled state machines apply rules to the input data to determine matches and produce associated priority indicators, wherein a first priority indicator is associated with at least one of the matches.

3. The apparatus of claim 2, wherein the microcode controlled state machines apply rules to select the at least one of the matches based on the first priority indicator.

4. The apparatus of claim 2, wherein:
the matches are associated with block indices; and
the first priority indicator includes a block index included in the block indices and associated with the at least one of the matches.

5. The apparatus of claim 4, wherein the first priority indicator is associated with a highest priority match included in the matches, and the first priority indicator includes a lowest block index included in the block indices.

6. The apparatus of claim 2, wherein the first priority indicator includes the first category match indicator vector.

7. The apparatus of claim 1, wherein each category match indicator is associated with a packet type or a packet flow.

8. The apparatus of claim 1, wherein the first circuit provides the combined category match information to a management port.

9. An apparatus, comprising:
a plurality of microcode controlled state machines including a first microcode controlled state machine and a second microcode controlled state machine;
a distribution circuit that routes input data to the plurality of microcode controlled state machines such that the first microcode controlled state machine applies a first rule to the input data, the first rule being associated with a first data category, and the second microcode controlled state machine applies a second rule to the input data, the second rule being associated with a second data category different from the first data category, wherein:
the plurality of microcode controlled state machines apply rules to the input data to determine matches and produce associated priority indicators; and
a first priority indicator is associated with at least one of the matches; and
a first circuit that augments the input data with the first priority indicator in response to selection of the at least one of the matches based on the first priority indicator, and that outputs the first priority indicator in addition to the input data;
wherein:
the first microcode controlled state machine determines a first category match indicator vector including a first category match indicator associated with the first data category and a second category match indicator associated with the second data category, wherein the first category match indicator indicates, based on application of the first rule, if the input data is in the first data category; and
the second microcode controlled state machine determines a second category match indicator vector including a third category match indicator associated with the first data category and a fourth category match indicator associated with the second data category, wherein the fourth category match indicator indicates, based on application of the second rule, if the input data is in the second data category.

10. The apparatus of claim 9, wherein the first circuit selects the at least one of the matches based on the first priority indicator.

11. The apparatus of claim 9, wherein the first circuit generates routing instructions for the input data based on a highest priority match included in the matches.

12. The apparatus of claim 9, wherein the first circuit generates routing instructions for the input data based on a plurality of the matches including a highest priority match.

13. The apparatus of claim 12, wherein the first circuit provides the priority indicators associated with the plurality of the matches to a management port.

14. The apparatus of claim 9, wherein:
the microcode controlled state machines apply rules to select the at least one of the matches based on the first priority indicator; and
the first circuit generates routing instructions for the input data based on a highest priority match included in the matches.

15. The apparatus of claim 9, wherein:
the microcode controlled state machines apply rules to select the at least one of the matches based on the first priority indicator; and
the first circuit generates routing instructions for the input data based on a plurality of the matches including a highest priority match.

16. The apparatus of claim 15, wherein the first circuit provides the priority indicators associated with the plurality of the matches to a management port.

\* \* \* \* \*